US007911541B2

(12) United States Patent
Yamamoto et al.

(10) Patent No.: US 7,911,541 B2
(45) Date of Patent: Mar. 22, 2011

(54) LIQUID CRYSTAL DISPLAY DEVICE

(75) Inventors: Tsunenori Yamamoto, Hitachi (JP); Katsumi Kondo, Mito (JP); Yuka Utsumi, Hitachi (JP)

(73) Assignee: Hitachi Displays, Ltd., Chiba-Ken (JP)

(*) Notice: Subject to any disclaimer, the term of this patent is extended or adjusted under 35 U.S.C. 154(b) by 1280 days.

(21) Appl. No.: 11/475,979

(22) Filed: Jun. 28, 2006

(65) Prior Publication Data

US 2007/0064162 A1 Mar. 22, 2007

(30) Foreign Application Priority Data

Jun. 28, 2005 (JP) ................................ 2005-188258

(51) Int. Cl.

*H04N 5/14* (2006.01)
*H04N 5/57* (2006.01)
*H04N 5/63* (2006.01)
*H04N 9/30* (2006.01)
*G09G 3/30* (2006.01)
*G09G 3/36* (2006.01)

(52) U.S. Cl. ........ 348/655; 348/690; 348/687; 348/730; 348/802; 345/77; 345/88

(58) Field of Classification Search .......... 348/790–791, 348/800–802, 655, 690, 687, 730; 345/77, 345/88, 102, 111

See application file for complete search history.

(56) References Cited

U.S. PATENT DOCUMENTS 5,731,794 A * 3/1998 Miyazawa ...................... 345/88
6,177,915 B1 * 1/2001 Beeteson et al. ............... 345/87
6,795,063 B2 * 9/2004 Endo et al. .................... 345/204
6,952,195 B2 * 10/2005 Arakawa ....................... 345/102
7,505,053 B2 * 3/2009 Brown Elliott et al. ...... 345/694
7,511,877 B2 * 3/2009 Kim et al. ..................... 359/296
7,583,279 B2 * 9/2009 Brown Elliott et al. ...... 345/694
2002/0011979 A1 1/2002 Nitta et al.
2003/0151694 A1 8/2003 Lee et al.
2004/0046725 A1 3/2004 Lee (Continued)

FOREIGN PATENT DOCUMENTS

JP 57-144590 9/1982

(Continued)

OTHER PUBLICATIONS

IDRC'03 p. 65 Uchida et al.

(Continued)

*Primary Examiner* — Brian Yenke
(74) *Attorney, Agent, or Firm* — Antonelli, Terry, Stout & Kraus, LLP.

(57) ABSTRACT

A liquid crystal display device includes a four-color conversion circuit with no chromatic changes in which the chromaticity and luminance of input image data are maintained, a four-color conversion circuit with chromatic changes in which the chromaticity and luminance of input image data are not necessarily maintained, and a selector for switching between the outputs from the two conversion circuits according to a level detection signal from a level detection circuit that detects whether the level of input image data is equal to 100% white level or higher. Display data from the selector is supplied to a liquid crystal section that displays an image by four-color pixels of red, green, blue, and white. The image data conversion circuit controls the light emission quantity of a backlight (BL) as white color, and converts input image data so that the level of data displayed on the liquid crystal section becomes uniform.

28 Claims, 13 Drawing Sheets

U.S. PATENT DOCUMENTS

| | | | | |
|---|---|---|---|---|
| 2004/0201562 | A1 | 10/2004 | Funamoto et al. | |
| 2005/0052364 | A1 * | 3/2005 | Otawara et al. | 345/63 |
| 2005/0057486 | A1 * | 3/2005 | Aoki et al. | 345/102 |
| 2005/0088385 | A1 * | 4/2005 | Elliott et al. | 345/87 |
| 2005/0141217 | A1 * | 6/2005 | Kim | 362/225 |
| 2005/0169551 | A1 * | 8/2005 | Messing et al. | 382/260 |
| 2005/0185100 | A1 * | 8/2005 | Akiyama | 348/678 |
| 2007/0024557 | A1 * | 2/2007 | Rho et al. | 345/88 |
| 2007/0058115 | A1 * | 3/2007 | Utsumi et al. | 349/109 |
| 2007/0176862 | A1 * | 8/2007 | Kurt et al. | 345/82 |

FOREIGN PATENT DOCUMENTS

| | | |
|---|---|---|
| JP | 08-065698 | 3/1996 |
| JP | 2001-147666 | 5/2001 |
| JP | 2001-154636 | 6/2001 |
| JP | 3215400 | 7/2001 |
| JP | 2002-41004 | 2/2002 |
| JP | 2002-0410004 | 2/2002 |
| JP | 2002-149116 | 5/2002 |
| JP | 2002-333858 | 11/2002 |
| JP | 2003-295812 | 10/2003 |
| JP | 2004-102292 | 4/2004 |
| WO | WO 01/37249 | 5/2001 |
| WO | WO 01/37251 | 5/2001 |

OTHER PUBLICATIONS

ITU-R Recommendation 705-9 pp. 1-31.

Uchida et al, "Progress in Viewing Angle of Liquid Crystal Displays", Department of Electronics, Graduate School of Engineering Tohoku University, Japan, IDRC'03, pp. 65-68.

"Parameter Values for the HDTV Standards for Production and International Programme Exchange", ITU-R BT. 709-5, Recommendation 709-5, pp. 1-31.

* cited by examiner

LIQUID CRYSTAL DISPLAY DEVICE

CLAIM OF PRIORITY

The present application claims priority from Japanese Application JP 2005-188258 filed on Jun. 28, 2005, the content of which is hereby incorporated by reference into this application.

FIELD OF THE INVENTION

The present invention relates to a liquid crystal display device with good display quality.

BACKGROUND OF THE INVENTION

While CRTs have been the mainstream of conventional general use display devices, recent years have seen the increasing use of active-matrix type liquid crystal display devices (hereinafter referred to as the "LCDs"). An LCD is a display device utilizing the light transmittance of liquid crystals. An LCD itself does not emit light; gray scale display is accomplished by controlling the light of a backlight on the back surface of the LCD between transmission, shut-off, and an intermediate state therebetween.

While LCDs have been mainly applied to the screen of notebook PCs and desktop PC monitors, in recent years, LCDs are beginning to be used as TVs. Since use of LCDs as TVs is subject to strict requirements in terms of brightness or that the color does not change no matter from which direction the display is viewed (wide viewing angle), the applicable liquid crystal display modes are limited.

The transmission characteristics and viewing angles of the liquid crystal display modes that have been published to date are concisely summarized in IDRC' 03 P.65 Uchida. et al.

Further, as a video display device for use as a TV, not only faithful reproduction of a display object but also achieving beautiful display is important. For instance, a TV using the CRT achieves a dynamic range higher than the full-screen white contrast ratio by utilizing white peak display characteristics.

The white display luminance of an LCD is determined by the luminance of the backlight and the transmittance of liquid crystals. Since enhanced luminance of the backlight leads to increased power consumption, it is desirable to improve the transmittance of liquid crystals.

As a method of realizing white peak display by substantially improving the transmittance of liquid crystals and thus increasing white luminance, as described in Japanese Patent Laid-Open No. 2000-147666 or Japanese Patent Laid-Open No. 2001-154636, for example, there is one aimed at improving the transmittance characteristics without increasing power consumption, by using a white-color (hereinafter, referred to as "W") pixel in addition to pixels of the three primary colors of red, green, and blue (hereinafter referred to as "R, G, and B").

Further, Japanese Patent Laid-Open No. 2002-149116 describes about switching between RGB display and RGBW display for a part of the area within the screen or on a screen-by-screen basis.

It should be noted that in a liquid crystal display device of the RGBW pixel structure as well, the image data signal to be input consists of only RGB, so it is necessary to carry out conversion from RGB image data to RGBW image data.

Here, making image display including white color inevitably results in image degradation due to chromatic purity degradation. In view of this, there have been proposed numerous RGB-RGBW conversion methods for making such image degradation relatively small and less conspicuous (see Japanese Patent Laid-Open Nos. 2001-147666, 2001-154636, 2002-149116, 2003-295812, and 2004-102292).

On the other hand, as a method of expanding the dynamic range of a display image, for example, there is one in which, as described in U.S. Pat. No. 3,215,400 below, the contrast and the luminance of the backlight are adjusted in a dynamic fashion in accordance with the input image data to be displayed, or one in which, as described in Japanese Patent Laid-Open No. 2002-41004 or Japanese Patent Laid-Open No. 2002-333858, the gray scale-luminance characteristics (hereinafter referred to as the "γ characteristics") are controlled through analysis of the input image data to be displayed, thereby achieving video display with sharp contrast.

It should be noted that the term white peak mentioned above refers to a display part of a level higher than that of normal white display due to light reflection or the like such as caused by metallic luster or water droplets within the display image. For such white peak display, dedicated data areas are specified by the NTSC or Hi-Vision standards that are television broadcast standards.

For example, in ITU-R Recommendation 709-5 which is an international Hi-Vision standard, when representing a signal of R, G, B, or Y (luminance level) by 10 bits of 0 to 1023, the image data range is set as 4 to 1019 (the rest being used as a timing signal), of which the black level is specified as 64 and normal white (nominal peak) is specified as 940. That is, the range from 940 to 1019 of the data area is a data area for white peak higher than normal white=100% white (it should be noted that the range from 64 to 4 is at the same black level throughout).

However, in the case of a TV using a liquid crystal display device or a so-called liquid crystal TV, as described above, using the RGBW structure as described in Japanese Patent Laid-Open Nos. 2001-147666, 154636/2001, 149116/2002, 295812/2003, and 102292/2004 in order to improve white display luminance without increasing power consumption inevitably results in image degradation due to chromatic purity degradation.

For example, while Japanese Patent Laid-Open No. 2001-147666 describes means for displaying an image while achieving improved luminance and without causing changes in the chromaticity at gray levels, the document also describes that such conversion is not possible for all the gray level regions but is possible only for the region as shown in FIG. 5 of Japanese Patent Laid-Open No. 2001-147666 mentioned above.

In regions other than this region, it is necessary to sacrifice either the chromaticity or the luminance enhancement factor; when display data outside this region is included in a normal image, the chromaticity or luminance enhancement factor of the corresponding pixel differs from that in other portions, resulting in an image failure.

It should be noted that color degradation can be made inconspicuous to some degree by using the conversion method described in each of Japanese Patent Laid-Open Nos. 2001-154636, 2002-149116, 2003-295812, and 2004-102292. However, when displaying the brightest primary color, the above-mentioned conversion method is not effective.

For instance, when white color is mixed into the brightest red color or the like for display, this always results in color degradation. The degree of degradation is readily discernable to an extent such that color degradation can be visually discerned even with the slightest admixture of white color.

As described above, although display in RGBW allows an improvement in luminance without an increase in power consumption, this is inevitably accompanied by color degradation, especially in the case of a bright image; the conversion method or the mastering of the technique is thus difficult, and hence there have not been many applications of the technique to the actual products.

SUMMARY OF THE INVENTION

An object of the present invention is to overcome such problems. That is, an object of the present invention is to provide a high-performance liquid crystal display device capable of achieving a substantial improvement in luminance with low power consumption.

In order to attain the above-mentioned object, according to the present invention, there is provided a liquid crystal display device including: a level detection circuit for detecting whether or not a level of input image data is higher than a predetermined level; an image data conversion circuit for converting input image data in accordance with a detection signal from the level detection circuit to switch between two kinds of conversion methods; and a liquid crystal display section that receives image data from the image data conversion circuit, for displaying an image by pixels of four colors of red, green, blue, and white.

Further, the level of the image data mentioned above refers to a 100% white level as represented by 100 IRE in the NTSC standard or 940 (nominal peak) in the HDTV 10-bit digital standard. In the image data conversion circuit, a conversion method adapted to image data of a level equal to or lower than the 100% white level (hereinafter, referred to as the "conversion A") is conversion in which the chromaticity and luminance are maintained as compared with those prior to the conversion, and a conversion method adapted to image data of a level higher than the 100% white level (hereinafter, referred to as the "conversion B") is not necessarily conversion in which the chromaticity is maintained as compared with that prior to the conversion. Each of the pixels of the liquid crystal display section includes four subpixels of red, green, blue, and white, and the respective subpixels are equal in surface area.

Further, the liquid crystal display device has a backlight whose light emission quantity can be controlled. The image data conversion circuit also controls the light quantity of the backlight in addition to converting image data. The light emission quantity of the backlight can be controlled as white color, and the image data conversion circuit converts image data so that the levels of the respective pixel data output to the liquid crystal section become uniform.

According to the present invention, the white peak data area within the input data is determined, and only the pixel data determined as white peak is subjected to data conversion that permits changes in the chromaticity of the RGBW display, thereby making it possible to provide a liquid crystal display device capable of achieving a substantial improvement in white luminance without causing an increase in power consumption.

Further, by making the data levels of the respective pixels of RGBW as uniform and equal as possible at the time of data conversion, the light emission quantity of the backlight can be reduced, whereby it is possible to provide a liquid crystal display device with lower power consumption.

DETAILED DESCRIPTION OF THE PREFERRED EMBODIMENTS

Embodiments of the present invention will now be described with reference to the drawings.

Embodiment 1

Figure 1:
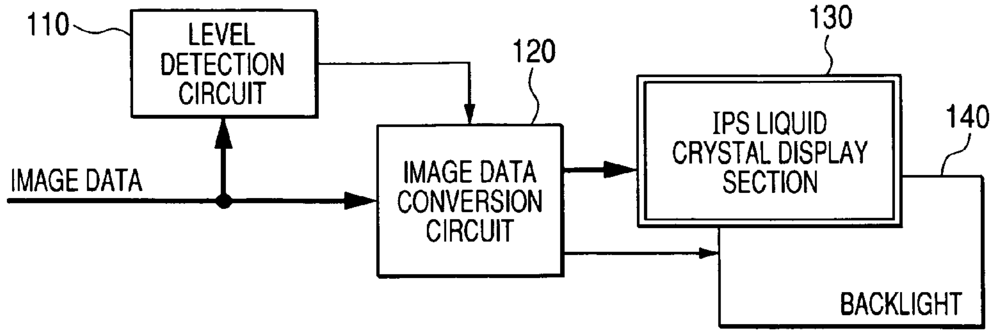
FIG. 1 is a block diagram of a liquid crystal display device according to Embodiment 1.

FIG. 1 is a block diagram of a liquid crystal display device according to this embodiment. The liquid crystal display device according to this embodiment is composed of a level detection circuit 110, an image data conversion circuit 120, a liquid crystal display section 130, and a backlight 140. Input image data to be displayed is input to the level detection circuit 110 for detection of the level of the input image data, and the result is output to the image data conversion circuit 120.

Further, on the basis of the input image data and a detection signal from the level detection circuit 110, the image data conversion circuit 120 performs conversion on the image data for output to the liquid crystal display section 130, and also controls the luminance of the backlight 140.

The liquid crystal display section 130 is composed of a pixel group having four subpixels of red, green, blue, and white. The four-subpixel structures 1, 2 are shown in FIGS. 2(2) and 2(3).

Figure 2:
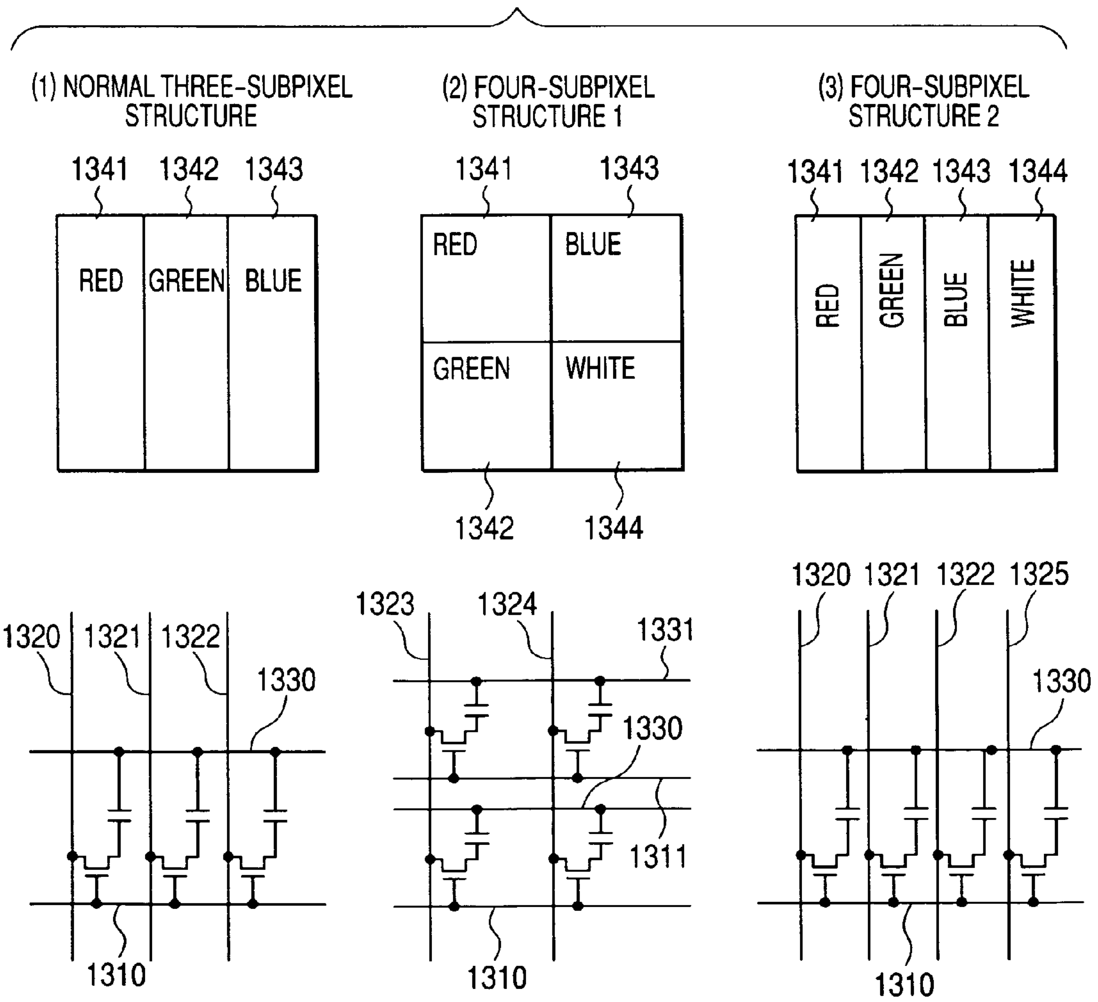
FIG. 2 (FIGS. 2(1), 2(2)) are diagrams of the pixel structure of the liquid crystal display device according to Embodiment 1.

It should be noted that FIG. 2(1) shows a normal three-subpixel structure (RGB pixel structure). According to this normal three-subpixel structure, one pixel is composed of a red subpixel 1341, a green subpixel 1342, and a blue subpixel 1343. The wiring for each pixel includes a gate line 1310, signal wirings (1320 to 1322) for respective colors, and a common line 1330. When a selection voltage is applied to the gate line 1310, voltages of the red signal line 1320, green signal line 1321, and blue signal line 1322 are written into the respective subpixels, and a gray scale is displayed by these voltages.

FIGS. 2(2) and 2(3) each show the four-subpixel structure (RGBW pixel structure) of red, green, blue, and white according to this embodiment.

First, unlike the normal three-subpixel structure, in the four-subpixel structure 1 shown in FIG. 2(2), the red subpixel 1341, the green subpixel 1342, the blue subpixel 1343, and the white subpixel 1344 are arranged in a square grid-like fashion.

In this case, the wiring for one pixel includes a second gate line 1311 in addition to the gate line 1310. Further, the signal lines are not provided for each of the colors but consist of two signal lines, a common signal line 1323 for red and green, and a common signal line 1324 for blue and white. Further, in addition to the common line 1330, another common line 1331 is arranged.

The method of writing pixel voltages is also different from that for the normal RGB structure: instead of writing all the voltages simultaneously into the subpixels constituting one pixel, for example, a selection voltage is applied to the second gate line 1311, and then, at the next timing, a selection voltage is applied to the gate line 1310. Accordingly, first the red subpixel 1341 and the blue subpixel 1343, and then the green subpixel 1342 and the white subpixel 1344 are written simultaneously.

On the other hand, in the four-subpixel structure 2 shown in FIG. 2(3), similarly to the normal three-subpixel structure, the red subpixel 1341, the green subpixel 1342, the blue subpixel 1343, and the white subpixel 1344 are laterally arranged side by side.

Only a white signal line 1325 is added to the wiring in this case as compared with the normal three-subpixel structure. The method of writing pixel voltages is also similar; the pixel voltages are written into the four subpixels simultaneously.

Now, the peripheral circuit (not shown) of the liquid crystal section according to the four-subpixel structure is considered. In the four-subpixel structure 1 shown in FIG. 2(2), the number of required gate line driver ICs becomes twice, while the number of required signal line driver ICs, which are more expensive than the gate line driver ICs, becomes 2/3. On the other hand, in the four-subpixel structure 2 shown in FIG. 2(3), the number of required gate line driver ICs is unchanged, and only the number of signal line driver ICs becomes 4/3.

It should be noted that although in the four-subpixel structure 1, the selection voltage application time for the gate line 1310 becomes half of that normally required and thus the voltage writing period tends to become insufficient, this embodiment adopts the four-subpixel structure 1.

As compared with the normal three-subpixel structure, the four-subpixel structure described above is additionally provided with the white subpixel 1344; accordingly, the surface area occupied by each of the other subpixels (the red subpixel 1341, the green subpixel 1342, and the blue subpixel 1343) is smaller than that in the normal three-subpixel structure. Therefore, when a display is made without using the white subpixel 1344, the transmittance, and hence the luminance decrease as compared with the normal three-subpixel structure.

Next, an image data conversion method according to this embodiment will be described with reference to FIGS. 3 to 7.

Figure 3:
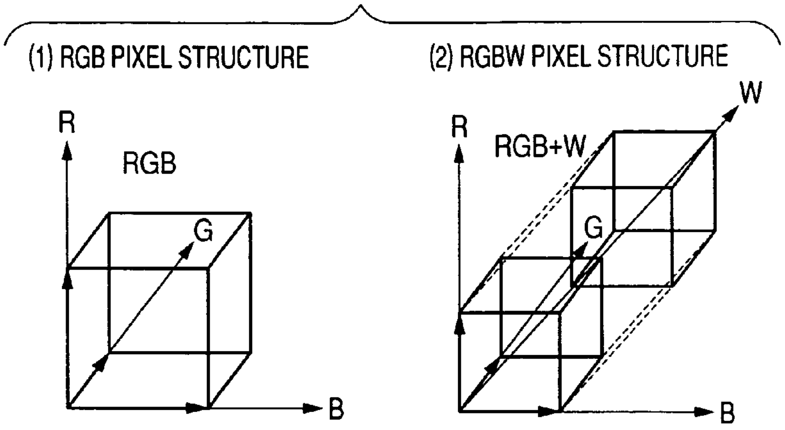
FIG. 3 is a three-dimensional diagram illustrating the color specification range of an RGBW pixel structure according to Embodiment 1.

First, referring to FIG. 3, a color specification range in the normal three-subpixel structure (RGB pixel structure) as shown in FIG. 3(1), and a color specification range in the four-subpixel structure (RGBW pixel structure) as shown in FIG. 3(2) will be described.

When the light emission intensities of red (R), green (G), and blue (B) are taken along the three-dimensional coordinate directions, in the RGB structure, as shown in FIG. 3(1), the inner portion of a cube is defined as the region capable of color specification.

On the other hand, in the RGBW pixel structure, as shown in FIG. 3(2), the light emission intensity of the W subpixel is along the axis extending toward the diagonal vertex of the cube. Accordingly, the region capable of color specification is the region through which the cube passes when translated in the direction of the diagonal vertex (dodecahedron).

It should be noted here that since the area of the RGB subpixels in the RGBW pixel structure is smaller than that in the RGB pixel structure, the size of the cube based on the RGB light emission intensity is smaller than that in the RGB pixel structure. This is reflected in FIG. 3, with the size of the cube being depicted small in FIG. 3(2).

The color specification range according to RGB color mixing represents a three-dimensional space as shown in FIG. 3. However, since it is difficult to clearly illustrate a three-dimensional space in the plane of the drawings which is a two-dimensional plane, in the following description, instead of the drawings mentioned above, drawings based on the use of only two colors will be used.

Figure 4:
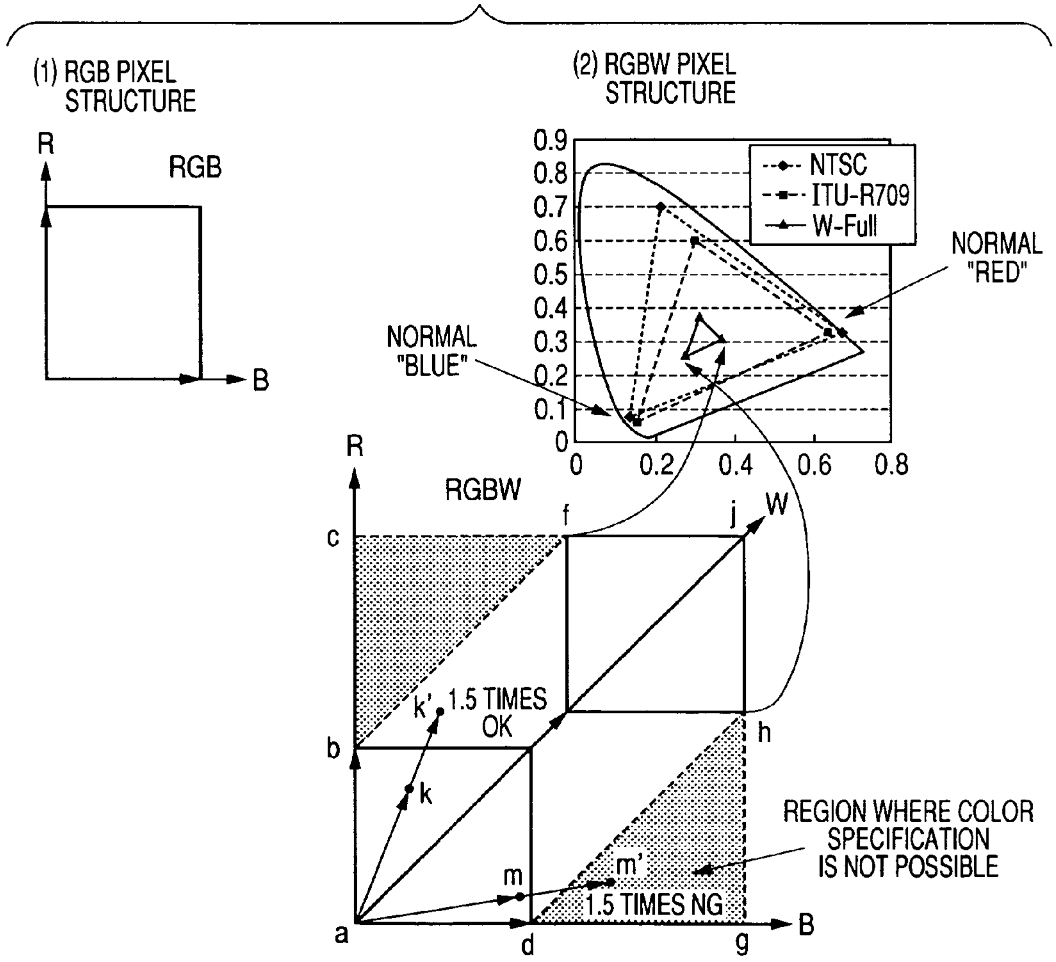
FIG. 4 is a two-dimensional diagram illustrating the color specification range of the RGBW pixel structure according to Embodiment 1.

FIG. 4 is a diagram illustrating the region capable of color specification in each of the RGB pixel structure and the RGBW pixel structure. As shown in FIG. 4(1), in the RGB pixel structure, the region capable of color specification is represented as a square. Further, as shown in FIG. 4(2), in the RGBW pixel structure, the region capable of color specification is represented as a hexagon obtained by translating the square in the diagonal direction and having the points a, b, f, j, h, and d in the drawing as the vertexes thereof.

If the square-shaped region capable of color specification in the RGB pixel structure is extended and applied to the RGBW pixel structure as it is while assuming an increase in light emission intensity, the inner portions of the respective triangles having b, c, and f, and d, g, and h as the vertexes thereof become regions where color specification is not possible.

Further, at the vertex f representing the brightest red and the vertex h representing the brightest blue, degradation in chromatic purity occurs due to the admixture of white color. In this connection, the color coordinates are calculated through simple simulation and the results are shown in an upper part of FIG. 4(2). The respective primary colors undergo significant degradation, and become almost white.

Description will now be given of how to convert RGB display data into RGBW data while suppressing chromatic changes.

Figure 5:
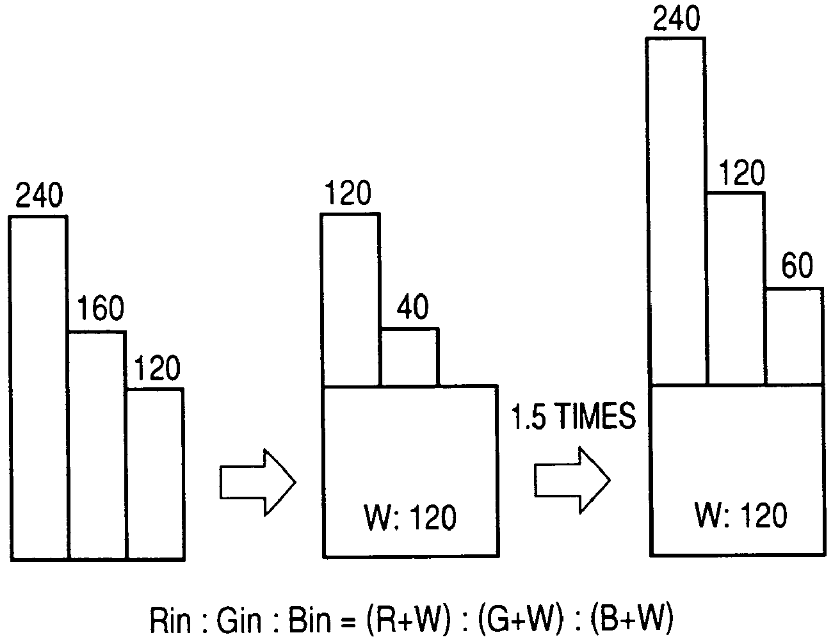
FIG. 5 is a diagram illustrating a known RGBW data conversion method involving no chromatic changes.

FIG. 5 shows an example of RGBW pixel data conversion method involving no chromatic changes as described in Japanese Patent Laid-Open No. 2001-147666. According to the method, the conversion is effected so that the RGB ratio (Rin:Gin:Bin) of the input image data and the ratio between respective color elements (R+W:G+W:B+W) in the RGBW output image data become equal to each other.

For example, when Rin=240:Gin=160:Bin=120, the smallest value, Bin, is first replaced as W, and then the result is multiplied by a luminance enhancement factor (in this case, 1.5 times) so that R+W=360, G+W=240, and B+W=180. The RGB ratio is 6:4:3 in the case of both input and output, which means that there is no chromatic change.

However, it is impossible to keep the luminance enhancement factor constant for all of the gray levels. For instance, when, as shown in FIG. 5, the luminance enhancement factor is 1.5 times, although an enhancement of 1.5 times (k') is possible for the color k shown in FIG. 4(2), in the case of the color m, an enhancement of 1.5 times (m') causes intrusion into the region where color specification is not possible.

The RGBW conversion method involving chromatic changes as described in Japanese Patent Laid-Open Nos. 2001-154636, 2002-149116, 2003-295812, and 2004-102292 deals with this problem of 1.5 times enhancement (m') by selectively using the less conspicuous of two solutions, one (involving chromatic changes) being: use of a color within the nearby color specification range as an alternative; and the other being: maintaining the color by reducing the luminance enhancement factor. This means that some of the pixels within the screen are unintentionally displayed in a color or luminance different from that in which they should be displayed, and is regarded as an image degradation roughly equivalent to an image failure.

In view of this, in this embodiment, attention is focused on the white peak characteristics, which are also defined by the NTSC standard and the Hi-Vision standard that are television broadcast standards. A white peak refers to an extremely small portion of "white" as present within the screen which is brighter than the 100% white display in the normal screen display.

The CRT, which is the mainstream of conventional display devices, is subject to the limitation that the total amount of light emission by the entire screen cannot exceed a certain value due to the limited power source capacity. Accordingly, the white luminance is improved unintentionally with white being displayed on only part of the screen rather than full-screen white, thereby making it possible to display "white peak" automatically, On the other hand, in conventional liquid crystal TVs, the light emission luminance of the backlight is the same across the entire screen, it naturally follows that full-screen white luminance=partial display white luminance.

However, in some liquid crystal TVs, by use of an image optimization engine, the image data is intentionally restructured so that full-screen white luminance<partial display white luminance, thereby achieving the simulation (reproduction) of the white peak.

Here, since the white peak often appears due to reflection of light as described above, it is presumed that very few pixels exhibit high chromatic purity in the case of white peak display.

Figure 6:
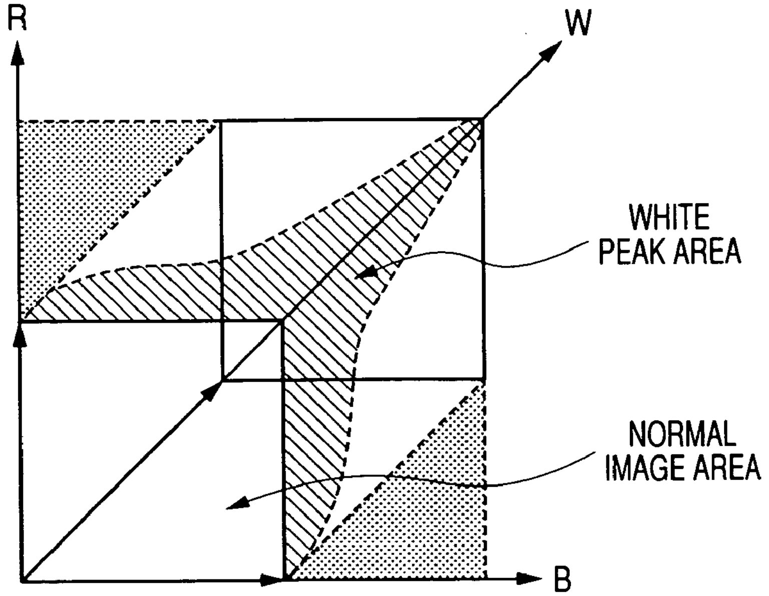
FIG. 6 is a diagram showing the color distribution of white peak display pixels within several images.

FIG. 6 shows the measured distribution of the colors of pixels in white peak display. It can be appreciated that at white peak, indeed, there are not many pixels that exhibit high chromatic purity.

In view of this, according to this embodiment, only those pixels having a level higher than the 100% white level as defined by the NTSC standard or Hi-Vision standard are subjected to RGBW conversion involving chromatic changes, and the pixels of a level equal to or lower than the 100% white level are subjected to RGBW conversion method (luminance enhancement factor: 1.0 time) involving no chromatic changes.

Accordingly, with respect to pixels of the white peak display level, although chromatic changes may occur, the probability is extremely low, and the luminance enhancement effect is high, whereby a substantial improvement in transmittance can be regarded as being achieved.

Further, this embodiment enables a further reduction in power consumption through the combination of the conversion method used at the time of RGBW conversion and the backlight modulation system. This will be described below with reference to FIG. 7.

Figure 7:
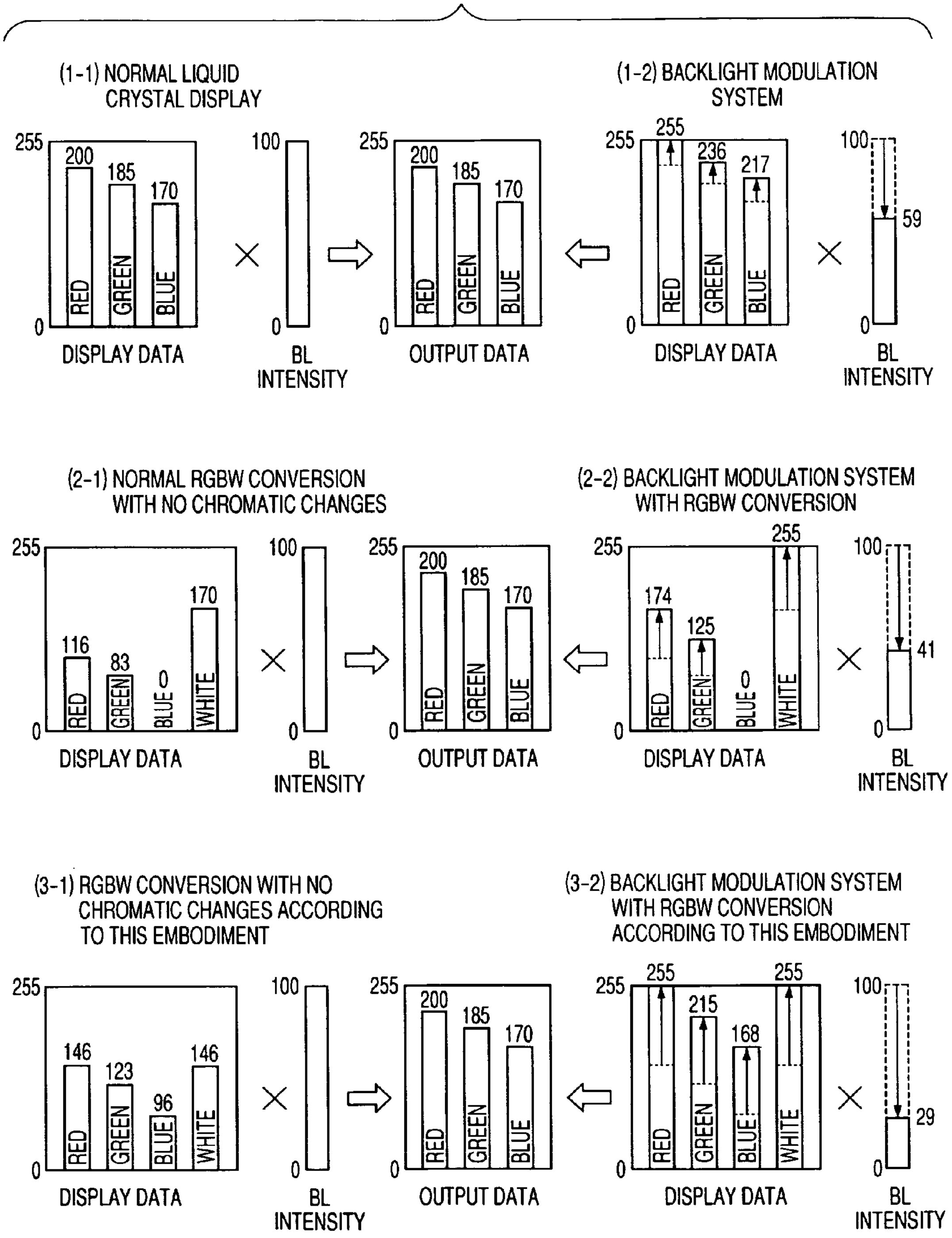
FIG. 7 (FIGS. 7(3-1), 7(3-2)) are diagrams showing an example of RGBW conversion according to Embodiment 1.

First, as shown in FIG. 7(1-1), in a normal liquid crystal display device of the RGB pixel structure, a case is considered in which, as the statistic values of one screen display data, the maximum value of red data is 200, the maximum value of green data is 185, and the maximum value of blue data is 170 (the maximum value that each data can take is 255).

Meanwhile, the backlight irradiates the liquid crystal display section with a light emission quantity of 100, and the distribution of the output data finally output as an image is the same as the display data distribution.

It should be noted that in the liquid crystal display device in this example, the transmittance of each color is set as being represented in proportion to a value obtained by multiplying data by the power of 2.2 as the data (gray scale)-transmittance characteristics.

That is, provided that the transmittance of maximum gray-scale data 255 is 255^2.2=196964.7 (arbitrary unit), the gray-scale data value indicating the half of this transmittance is approximately 186 (186^2.2=98384.9).

With regard to the normal liquid crystal display as described above, there is a method in which, as descried in U.S. Pat. No. 3,215,400 mentioned above, the light emission quantity of the backlight is modulated on a screen-by-screen basis to thereby obtain output data that is the same as the original display data. This method will be described below with reference to the example shown in FIG. 7(1-2).

In FIG. 7(1-2), with respect to red having the maximum value in the original display data, the maximum value of 200 is converted to 255 that is the maximum value that data can take, and the light emission quantity of the backlight is reduced by an amount corresponding to an increase in transmittance.

In this case, the light emission quantity of the backlight can be made 59 ((200/255)^2.2=0.586). It should be noted that conversion of green and blue data is performed in such a manner as to increase the transmittance by an amount corresponding to a decrease in the light emission quantity of the backlight.

For example, the maximum data value is converted from 185 to 236 and from 170 to 217 in the cases of green and blue, respectively ((185/236)^2.2=0.585, (170/217)^2.2=0.584). Accordingly, while making the output data the same as the original display data, it is possible to achieve a reduction in the light emission intensity of the backlight and hence a reduction in the power consumption of the backlight.

While the backlight modulation method enables reduced power consumption as described above, care must be taken when applying this method to RGBW conversion. Usually, as described in Japanese Patent Laid-Open No. 2001-147666, RGB-RGBW data conversion is performed in such a manner as to make data allocation to the white pixel maximum in order to maximize the light utilization efficiency.

However, if, as a result of this conversion, the output of the white pixel becomes the maximum in comparison to those of pixels of other colors, the backlight light-emission quantity reducing effect due to backlight modulation may not become the maximum. This will be described below with reference to FIG. 7.

First, FIG. 7(2-1) shows display data obtained when the maximum values of data of the respective colors shown in FIG. 7(1-1) are subjected to RGBW conversion with no chromatic changes and at a luminance enhancement factor of 1.0 times (also no improvement in luminance) as described in Japanese Patent Laid-Open No. 2001-147666. The white components of the original display data (minimum data values of R, G, and B=common value=white component) are all replaced as white color data.

When applying the backlight modulation method to this display data, as shown in FIG. 7(2-2), data conversion is effected such that 170, which is the data value of white as the largest of the data values of all the colors, becomes 255. In this case, the backlight light-emission quantity can be made 41 ((170/255)^2.2=0.41)

However, a further reduction in power consumption can be achieved if the operation of "making data allocation to the white pixel maximum", which is the basic requirement for conventional RGBW conversion, is not performed.

In this connection, FIG. 7(3-1) shows display data of the case in which the maximum values of respective color data shown in FIG. 7(1-1) are subjected to RGBW conversion by the method according to this embodiment. In this embodiment, data allocation to the white pixel is not made maximum but conversion is effected so as to make the maximum data values of respective colors uniform (equal).

In the example shown in FIG. 7(3-1), the maximum white data value is converted into 146 that is equal to the maximum red (color having the largest data value in the original display data) data value. The transmittance of the data value 146 ((146/255)^2.2=0.293) is half the value of the transmittance of the original red display data 200 ((200/255)^2.2=0.586). By equally dividing the original red component output between the red components output from the red pixel and the white pixel, the maximum data values of the respective colors are made equal. Further, the data value of the green pixel is a data value 123 ((123/255)^2.2=0.201=0.494−0.293) obtained by subtracting the green component output from the white pixel ((146/255)^2.2=0.293) from the transmittance of the original data value 185 ((185/255)^2.2=0.494). It should be noted that likewise, the data value of the blue pixel is a data value 96 ((96/255)^2.2=0.117=0.41−0.293) obtained by subtracting the blue component in the white pixel from the original data value 170 ((170/255)^2.2=0.41).

While in this example the maximum data value of white=the maximum data value of red, these values may not necessarily be equal but may be made uniform so that the maximum data values of the respective colors become equal. Further, while in this example the white data value does not become higher than the output of another color component (such as green or blue) even when the half of the maximum data value is allocated to the white data value as it is, if it becomes higher than the output of another color component (such as in the case of too much blue component), the white data value must be reset so as not to exceed this output.

Further, when the backlight modulation method is applied to this display data, as shown in FIG. 7(3-2), data conversion is effected so that 146 as the maximum data value of red and white becomes 255.

In this case, the light-emission quantity of the backlight can be reduced to 29 ((146/255)^2.2=0.29), whereby a further reduction in power consumption can be achieved as compared with the backlight light-emission quantity of 41 shown in FIG. 7(2-2).

As described above, according to this embodiment, when executing RGBW data conversion and the backlight modulation method at the same time, the RGBW conversion is effected so that the maximum data values of the respective colors become uniform, thereby making it possible to achieve a further reduction in power consumption.

Figure 8:
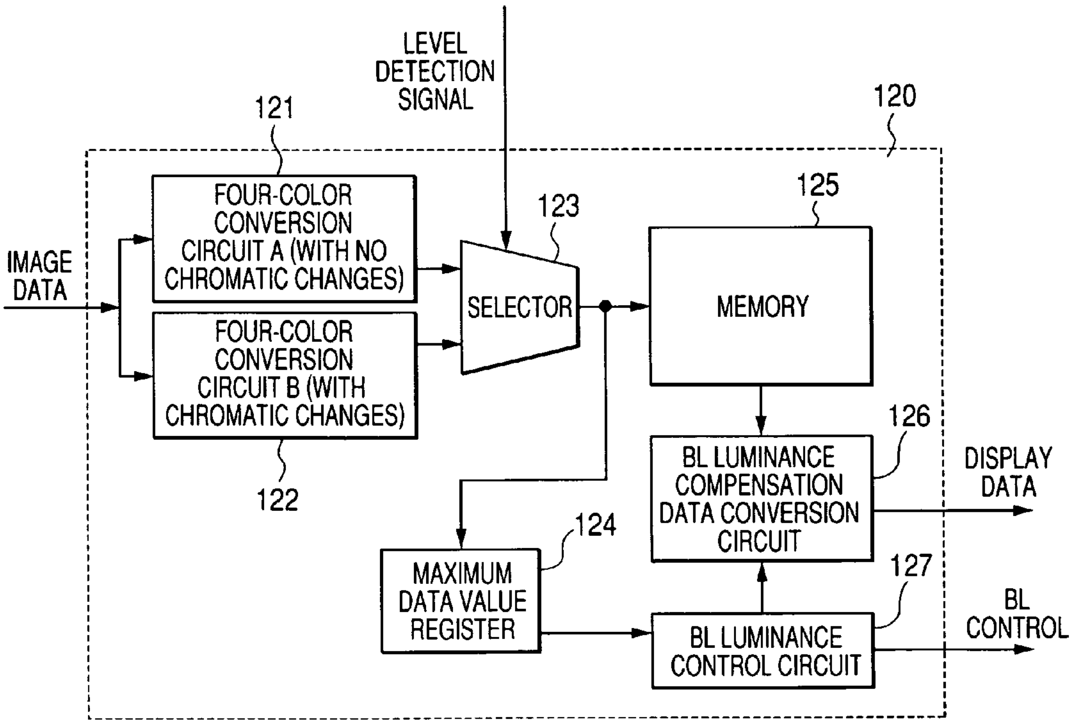
FIG. 8 is an internal block diagram of an image data conversion circuit according to each of Embodiments 1 and 2.

It is the image data conversion circuit that controls the RGB data conversion and the backlight modulation method. FIG. 8 is an internal block diagram of the image data conversion circuit 120 according to this embodiment.

The image data input to the image data conversion circuit 120 is first converted into RGBW data. In the image data conversion circuit 120, there are a four-color conversion circuit A121 for converting RGB data into RGBW data without chromatic and luminance changes, and a four-color conversion circuit B122 for converting RGB data into RGBW data with chromatic and luminance changes. The input image data is input to both the conversion circuits.

As described above with reference to FIG. 7, the difference from conventional RGBW conversion is that in either of the RGBW four-color conversion circuits, RGBW conversion is effected such that the respective data outputs of RGBW become uniform.

On the basis of a level detection signal from the level detection circuit 110 shown in FIG. 1, either one of the RGBW data respectively output from the four-color conversion circuits A and B is selected by a selector 123. That is, if the data is regarded as that of the white peak region, the signal from the conversion circuit B is selected, and if the data is equal to or lower than normal 100% white, the signal from the conversion circuit A is selected.

The RGBW data output from the selector is temporarily retained in a memory 125. On the other hand, a maximum data value register 124 retains the maximum values of the respective color data output during the retention period.

The data retention period depends on the backlight control unit; when the backlight is controlled identically across the entire screen, the data retention period equals the display time of one screen (one frame=approximately 16.6 msec). In the case where the screen is split into backlight control units (split control backlight), the data retention time equals the time on the basis of each backlight control region.

It should be noted that since the backlight is controlled identically across the entire screen in this embodiment, display data corresponding to one screen is retained in the memory 125.

After display data corresponding to one screen is retained in the memory 125, and the maximum data value for each color within the screen is set in the maximum data value register 124, a BL luminance control circuit 127 calculates the backlight light-emission quantity on the basis of the maximum data value for each color, and controls the light emission quantity of the backlight at the time of displaying the next screen.

On the other hand, a BL luminance compensation data conversion circuit 126 sequentially reads display data in the memory 125, and after performing data conversion on the basis of the backlight light-emission quantity signal input from the BL luminance control circuit 127 so as to compensate for the backlight luminance, outputs the resultant data as the display data for the next screen to the liquid crystal display section 130 shown in FIG. 1.

It should be noted that when performing conversion on the backlight luminance compensation data by using the maximum data value of each color within the image of the previous screen, it is also possible to omit the memory 125 and input the output from the selector 123 directly to the BL luminance compensation data conversion circuit 126.

As described above, according to this embodiment, by performing RGBW conversion with chromatic changes only on the white peak display data area, the transmittance is substantially improved, thereby making it possible to achieve a substantial improvement in white luminance without causing an increase in power consumption. Further, the conversion into RGBW data is performed so that the respective data values becomes as equal and uniform as possible, whereby extremely low power consumption can be achieved by the use of backlight modulation. Accordingly, it is possible to provide a liquid crystal display device capable of achieving both a substantial improvement in white luminance and low power consumption.

Embodiment 2

This embodiment is the same as Embodiment 1 except for the requirement described below.

In a liquid crystal display device according to this embodiment, with respect to data outside of the white peak data area, RGBW conversion is not performed and RGB data is used as it is.

That is, in the block diagram of FIG. 8, the RGBW four-color conversion circuit A121 within the image data conversion circuit 120 does not actually execute RGBW conversion but allows RGB data to pass therethrough as it is.

The RGBW four-color conversion circuit A121 according to this embodiment can thus be made at an extremely low cost.

It should be noted, however, that with respect to a video with no white peak display, the data values of the respective colors are not necessarily always uniform, and hence the effect of power consumption reduction due to backlight modulation becomes smaller.

However, as in Embodiment 1, the RGBW four-color conversion circuit B122 performs RGBW conversion with chromatic changes so that data of respective colors become uniform. Therefore, as in Embodiment 1, a significant power consumption reducing effect can be achieved with respect to a bright screen with the white peak.

As described above, according to this embodiment, data outside the white peak data area is not subjected to RGBW conversion but is displayed in RGB, thereby making it possible to reduce the cost of the conversion circuit.

Accordingly, although the power consumption reducing effect slightly decreases, a significant power consumption reducing effect can be achieved as in Embodiment 1 with respect to a bright screen including white peak display data, whereby a liquid crystal display device capable of achieving both a substantial improvement in white luminance and low power consumption can be provided at low cost.

Embodiment 3

This embodiment is the same as Embodiment 2 except for the requirement described below.

Figure 9:
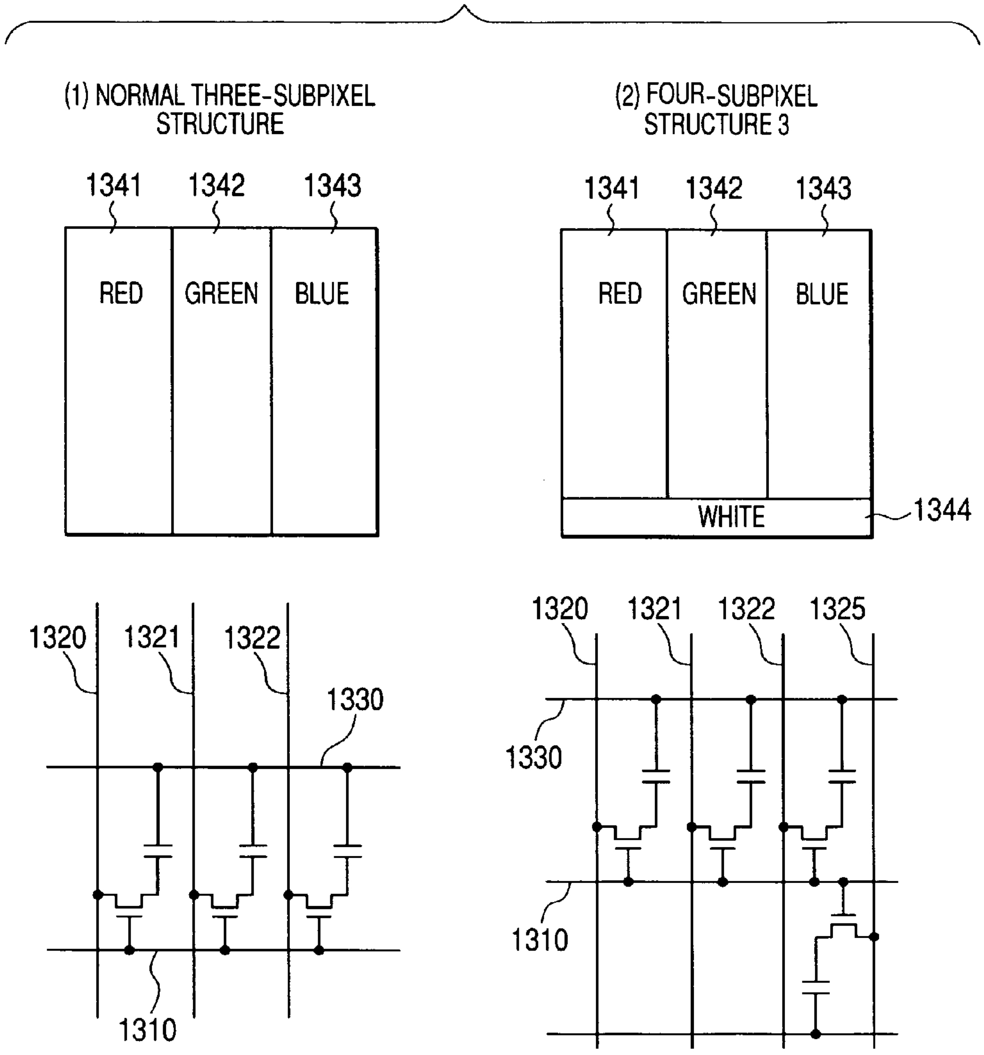
FIG. 9 (FIG. 9(2)) is a diagram of the pixel structure of a liquid crystal display device according to Embodiment 3.

FIG. 9(2) shows the RGBW pixel arrangement in the liquid crystal display section 130 according to this embodiment. It should be noted that FIG. 9(1) shows the normal three-subpixel structure (RGB pixel arrangement).

In this embodiment, the white subpixel 1344 has a small surface area relative to the three subpixels of red, green, and blue, and the pixel arrangement is also different from those of the two four-subpixel structures 1 and 2 according to Embodiment 1 shown in FIGS. 2(2) and 2(3), respectively.

This is because the arrangement for making the surface area of the white subpixel 1344 smaller than those of the other three colors is difficult to achieve with the structures shown in FIGS. 2(2) and 2(3). The wiring structure with respect to one pixel is close to that shown in FIG. 2(3), with signal lines being arranged on a color-by-color basis.

As described in detail above with reference to Embodiment 1, arranging a white pixel in order to realize the RGBW pixel structure causes a reduction in the pixel surface area of the three RGB colors that are originally present, which means reduced brightness when displaying the primary colors such as red, green, and blue. Further, the surface area of the white pixel has a relation with the brightness at white peak, and the size of the surface area determines the brightness at white peak.

That is, in the RGBW pixel structure according to this embodiment, by adjusting the surface area of the white pixel at the time of designing pixels, it is possible to design the brightness at white peak and the brightness when displaying the respective primary colors.

It should be noted that in this embodiment, in order to give priority to the brightness when displaying the respective primary colors, as described above, the surface area of the white subpixel is smaller than those of the RGB subpixels.

Here, the surface area of the white subpixel is set so that the white peak luminance when the maximum white peak signal is input is about 20% higher than that of 100% white displayed in RGB.

This is because, considering the level setting values for Hi-Vision television signals (black level: 64, 100% white level: 940, and maximum white peak: 1019) and the brightness-level characteristics ($\gamma$=0.45), the maximum white peak level is about 20% brighter than the 100% white level. That is, $((1019-64)/(940-64))^\wedge(1/0.45)=1.2115$.

Further, the backlight according to this embodiment is a backlight using LEDs (light emitting diodes) that can be controlled for each of the three primary colors of red, green, and blue.

While the light emission quantity of this backlight is controlled by the BL luminance control circuit inside the image data conversion circuit as in Embodiment 1, in this embodiment, the backlight controlling method for the screen including pixels in the white peak display data area and that for the screen including only data of 100% white or less differ from each other. For the screen including only data of 100% white or less, the control is performed individually for each of the three primary colors of red, green, and blue, and for the screen including pixels in the white peak display data area, the three colors of red, green, and blue are identically handled for control as white color.

Figure 10:
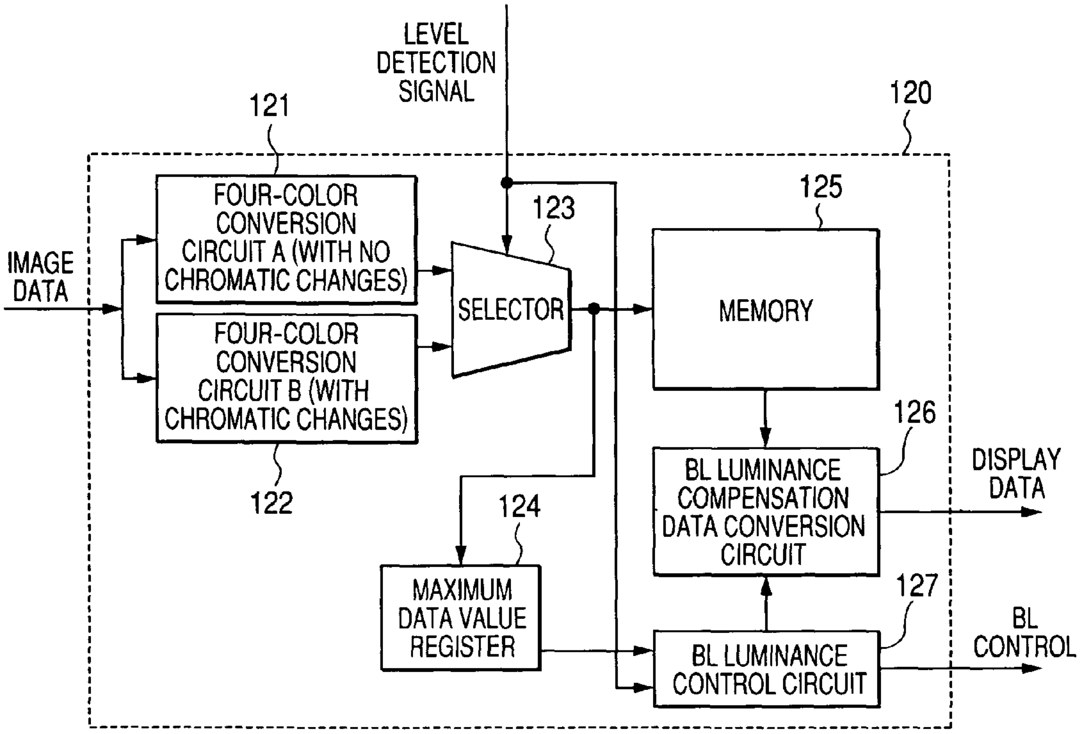
FIG. 10 is an internal block diagram of an image data conversion circuit according to Embodiment 3.

Therefore, as shown in FIG. 10, in the image data conversion circuit 120 according to this embodiment, the level detection signal from the level detection circuit 110 is also input to the BL luminance control circuit 127, whereby the presence/absence of the white peak is determined on a screen-by-screen basis.

From the viewpoint of reducing the power consumption of the backlight, by controlling the three primary colors of the backlight independently and converting the display data accordingly, a further reduction in power consumption can be achieved as compared with the case where they are handled as white at the same level.

However, when the three primary colors of the backlight are independently controlled in the case of the RGBW pixel structure, the light output through the white subpixel is not necessarily white.

As in Embodiment 1, the light emission quantities of the three primary colors of the backlight are calculated from the maximum data values of the respective colors; if light exiting the white subpixel is other than white, the light emission quantity of the backlight or display data must be calculated again while taking the chromaticity of the light into account.

This calculation must be repeated over and over until convergence is reached, and causes a very large increase in the scale of the circuit required for calculation. Further, the calculation time may become insufficient for images that must be displayed in real time.

In view of this, according to this embodiment, for the screen including display data in the white peak display data area, data is converted into RGBW and the backlight is controlled with RGB being collectively handled as white color, and for other screens, data is not converted into RGBW and the backlight is controlled with the three primary colors being controlled independently. Accordingly, as compared with Embodiment 2, a reduction in power consumption can be achieved even for a screen with no white peak display data area.

As described above, in this embodiment, when displaying data, the control mode of the backlight is switched in accordance with the presence/absence of white peak display within the display screen, thereby enabling a further reduction in power consumption.

Embodiment 4

This embodiment is the same as Embodiment 3 except for the requirement as described below.

Figure 11:
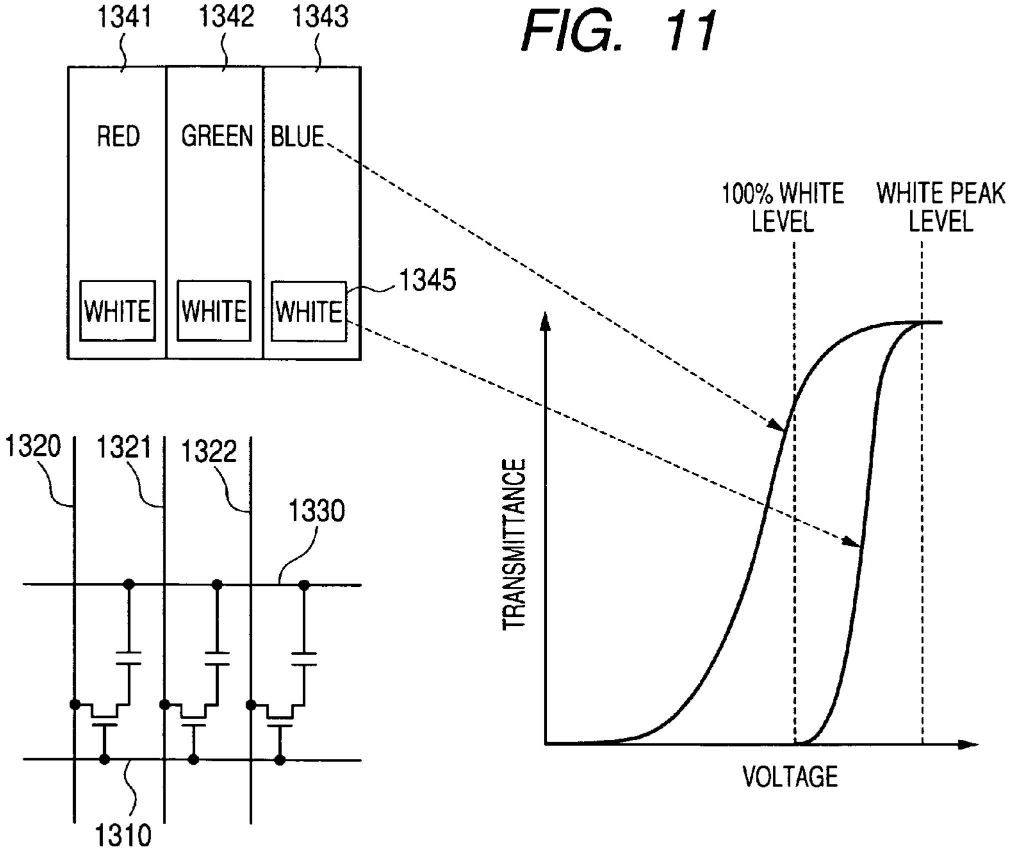
FIG. 11 is a diagram showing an RGBW pixel structure and voltage-transmittance characteristics according to Embodiment 4

A pixel structure according to this embodiment is shown in FIG. 11. In this embodiment, the pixel structure is different from that of Embodiment 3 in that a white auxiliary pixel area 1345 is included in each of the red, green, and blue subpixels.

It should be noted that the white auxiliary pixel area 1345 is not individually driven by a transistor or signal line but shares the voltage value with other areas within each of the red, green, and blue subpixels. However, the white auxiliary pixel area 1345 differs from the other areas in voltage-transmittance characteristics; the voltage threshold at which the transmittance begins to increase is high, with a steep increase of the transmittance thereafter.

Due to these characteristics, in the case of application of a voltage not higher than the threshold for the white auxiliary pixel area 1345, display can be performed with no chromatic changes using the RGB pixels, and in the case of application of a voltage not lower than the threshold for the white auxiliary pixel area 1345, display with chromatic changes and with a luminance improving effect using the RGBW pixels is possible.

Accordingly, the RGBW four-color conversion circuit B122 within the image data conversion circuit 120 can be made extremely small in scale, thereby allowing a reduction in cost.

The above-described voltage-transmittance characteristics of the white auxiliary pixel area 1345 can be realized through optimization of the parameters of the pixel electrode structure.

Figure 12:
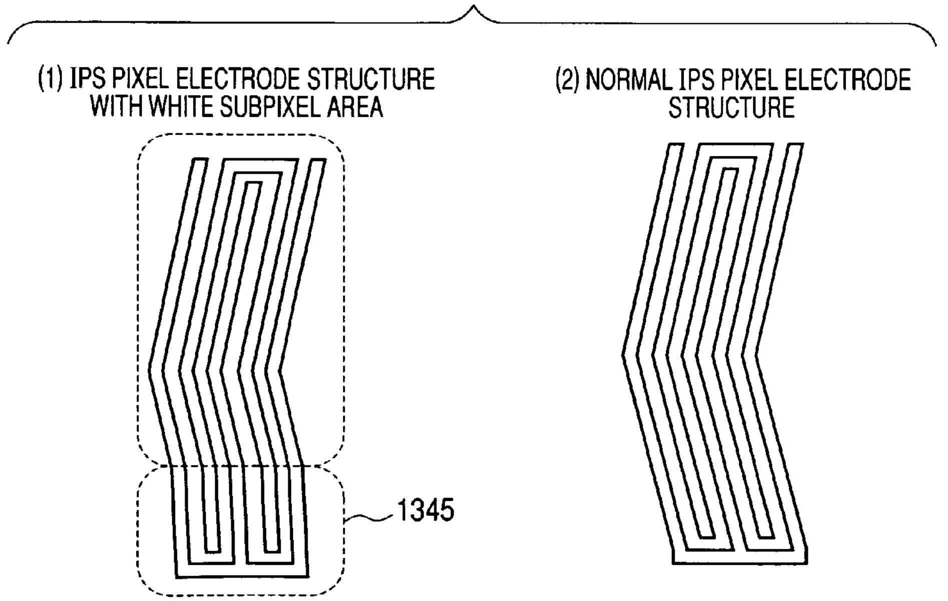
FIG. 12 (FIG. 12(1)) is a diagram showing the pixel electrode structure for the RGBW pixel structure according to Embodiment 4.

In this connection, FIG. 12 are diagrams showing a pixel electrode structure according to this embodiment, in which FIG. 12(1) shows the pixel electrode structure according to this embodiment, and FIG. 12(2) shows a pixel electrode structure according to a normal IPS system liquid crystal mode.

Here, an IPS system is the abbreviation of In-Plane Switching, and refers to a system in which the light transmittance of liquid crystals is controlled by applying a voltage within the substrate plane of the liquid crystal display section. Accordingly, in the pixel electrode structure shown in FIG. 12(2), two kinds of comb-like electrodes are arranged in a staggered manner so that an electric field is applied in the direction parallel to the substrate.

The reason for bending the comb-like electrodes without making them linear is to regulate the initial rotation direction of the liquid crystal molecules, and the reason for making the bending direction different between the upper and lower parts is to achieve a so-called multi-domain structure in which image degradation due to the viewing angle is cancelled out by making the liquid crystal rotation directions opposite between the upper and lower parts.

In the IPS pixel structure according to this embodiment, there is provided an area in a part of the comb-like electrode where the bending angle is set smaller than that in the other areas. This portion corresponds to the white auxiliary pixel area 1345 shown in FIG. 12(1).

The characteristic feature of the IPS pixel structure is that the voltage-transmittance characteristics are changed by making the bending angle small, so that the voltage threshold becomes high and the rate of increase of transmittance thereafter becomes steep.

It should be noted that as in Embodiment 3, the surface area of the white auxiliary pixel area 1345 is set so that upon input of the maximum white peak signal, the white peak luminance becomes 20% higher than the normal 100% white.

As described above, according to this embodiment, within each of the red, green, and blue subpixels, the secondary white subpixel area with voltage-transmittance characteristics different from those of the respective subpixels is provided. The circuit for RGBW conversion can thus be made extremely small in scale, whereby a liquid crystal display capable of achieving both a substantial improvement in white luminance and low power consumption can be provided at lower cost. It should be noted that while in this embodiment the white auxiliary pixel area is arranged at an end of the screen, the white auxiliary pixel area may be arranged at the central portion of the screen to achieve the multi-domain structure also with respect to the white auxiliary pixel area.

Embodiment 5

This embodiment is the same as Embodiment 4 except for the requirement as described below.

Figure 13:
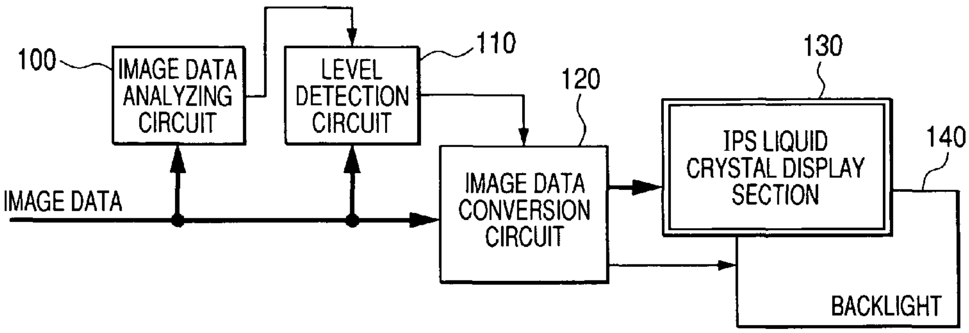
FIG. 13 is a block diagram of a liquid crystal display according to each of Embodiments 5 and 10.

FIG. 13 is a block diagram of a liquid crystal display device according to this embodiment. In the liquid crystal display device according to this embodiment, the input image data is also input to an image data analyzing circuit 100. The image data analyzing circuit 100 extracts pixels that are recognized as the white peak from the input one screen image, and sends the minimum level value of the white peak data of those recognized pixels to the level detection circuit 110 as the 100% white display level.

Unlike in Embodiments 1 to 4, the level detection circuit 110 does not perform level detection on the basis of the 100% white level prescribed by a specific standard but performs level detection on the basis of the 100% white display level on a screen-by-screen basis sent from the image data analyzing circuit 100 and outputs whether or not the data is white peak display data.

This is because the 100% white level often varies according to the kind of the input image data, and moreover because there are image signals that do not comply with the assumed 100% white level.

For example, the value of the 100% white level is different between the NTSC standard that is an analog broadcast standard in Japan, and the ITU-R recommendation 705 that is a Hi-Vision broadcast standard. Further, some of image signals output from a DVD player or the like use the white peak region as if it were a normal region (this is particularly the case with video contents of a cinema film material).

Under such circumstances, the method of detecting white peak display data by defining the 100% white level in advance may result in situations where the luminance improving effect becomes limited or excessive.

In view of this, in this embodiment, there is provided means (image data analyzing circuit 100) for determining the 100% white level on a screen-by-screen basis by performing image data analysis for each screen. Accordingly, the white level can be recognized with greater accuracy, thereby making it possible to achieve an image of higher image quality.

As described above, according to this embodiment, the 100% white level is recognized through image analysis on a screen-by-screen basis, whereby it is possible to provide a liquid crystal display device capable of displaying an image of higher image quality.

Embodiment 6

This embodiment is the same as Embodiment 1 except for the requirement as described below.

Figure 14:
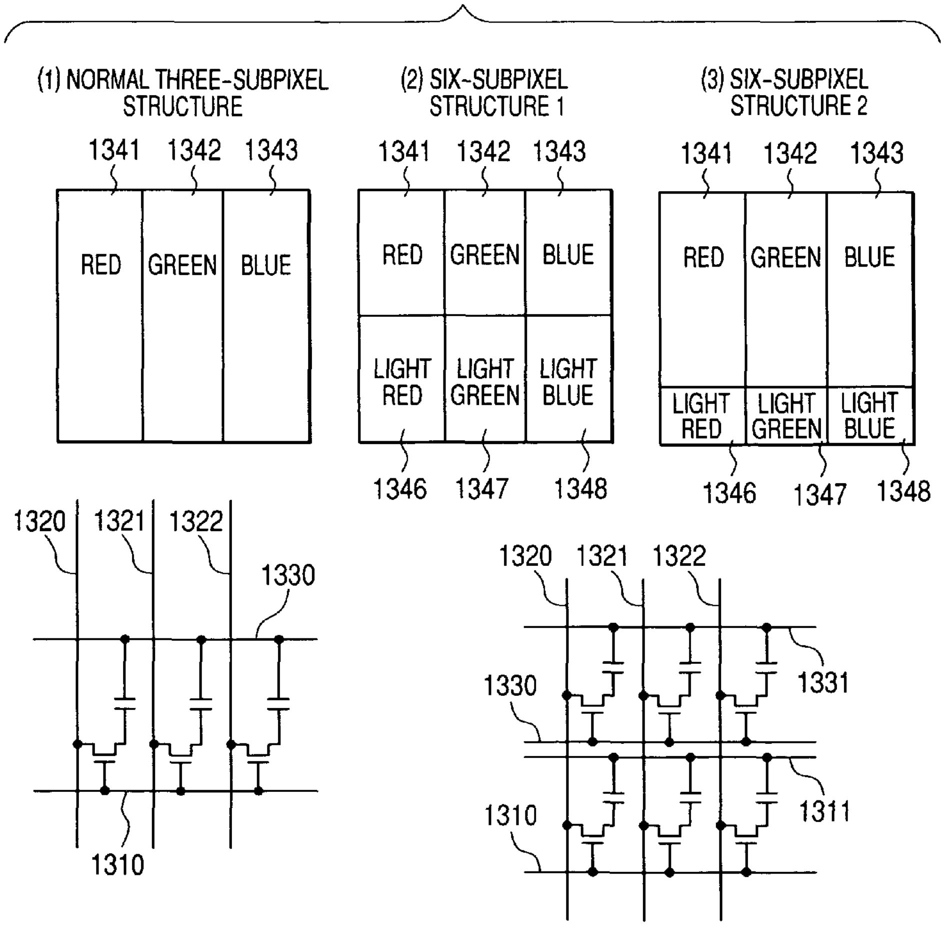
FIG. 14 (FIGS. 14(2), 14(3)) are diagrams of the pixel structure of a liquid crystal display according to Embodiment 6.

FIGS. 14(2) and 14(3) show the pixel structure of a liquid crystal display device according to this embodiment. In the liquid crystal display device according to this embodiment, instead of a white subpixel, a light red subpixel 1346, a light green subpixel 1347, and a light blue subpixel 1348 are arranged in addition to the subpixels of red, green, and blue. It should be noted that FIG. 14(1) shows the normal three-subpixel structure.

As shown in FIGS. 14(2) and 14(3), the wiring for each one pixel consists of two gate lines 1310 and 1330, and two common lines 1311 and 1331. When a selection voltage is applied to the gate line 1310, a voltage is written from each of the red signal line 1320, the green signal line 1321, and the blue signal line 1322 into the red subpixel 1341, the green subpixel 1342, and the blue subpixel 1343, respectively. When a selection voltage is applied to the second gate line 1330, a voltage is written into each of the light red subpixel 1346, the light green subpixel 1347, and the light blue subpixel 1348.

In this embodiment, the pixel surface area of the red subpixel 1341, the green subpixel 1342, and the blue subpixel 1343 is designed to be the same as the pixel surface area of the light red subpixel 1346, the light green subpixel 1347, and the light blue subpixel 1348, resulting in a six-subpixel structure 1 shown in FIG. 14(2).

Figure 15:
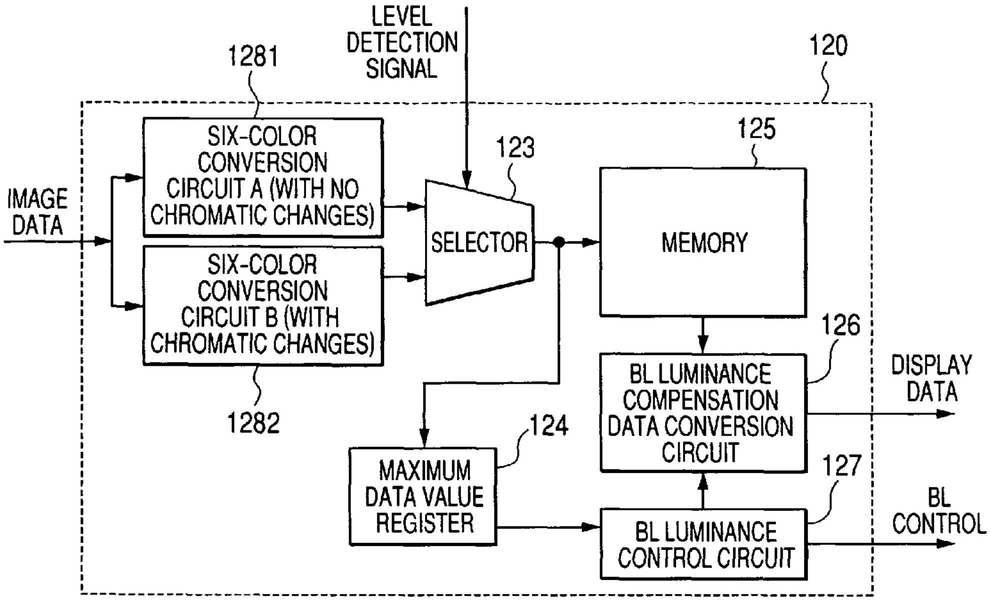
FIG. 15 is an internal block diagram of an image data conversion circuit according to each of Embodiments 6 and 7.

Next, FIG. 15 is an internal block diagram of the image data conversion circuit 120 according to this embodiment. In this embodiment, instead of the RGBW four-color conversion circuits A and B in Embodiment 1, there are provided a six-color conversion circuit A1281 for converting RGB data into six-color data without chromatic changes, and a six-color conversion circuit B1282 for converting RGB data into six-color data with chromatic changes.

As described above with reference to Embodiment 1, the problem with the RGBW pixel structure is the chromatic change. In Embodiment 1, only the white peak data area is subjected to conversion with chromatic changes, thereby making the influence of chromatic changes as inconspicuous as possible. However, the influence of chromatic changes can be made even more inconspicuous if the chromatic changes with respect to the white peak data area can be further suppressed.

To this end, according to this embodiment, the effect of the white subpixel is realized in the form of split subpixels in which the respective colors of red, green, and blue are lightened.

Accordingly, within the white peak data area, the portion of display data that must be subjected to conversion with chromatic changes is reduced, thereby achieving a further reduction in the influence of color conversion.

As described above, according to this embodiment, chromatic changes or variations in the white peak data area can be further suppressed, whereby it is possible to provide a liquid crystal display device of a high image quality capable of achieving both a substantial improvement in white luminance and low power consumption.

Embodiment 7

This embodiment is the same as Embodiment 6 except for the requirement as described below.

In a liquid crystal display according to this embodiment, for data outside the white peak data area, six-color conversion is not performed and RGB data is used as it is.

That is, in FIG. 15, the six-color conversion circuit A1281 within the image data conversion circuit 120 does not actually execute six-color conversion but allows RGB data to pass therethrough as it is.

The six-color conversion circuit A1281 according to this embodiment can thus be made extremely low cost.

It should be noted, however, that with respect to a video with no white peak display, the data values of the respective colors are not always uniform, and hence the power consumption reducing effect due to backlight modulation becomes smaller.

However, as in Embodiment 6, the six-color conversion circuit B1282 performs six-color conversion with chromatic changes so that data of respective colors become uniform. Therefore, as in Embodiment 6, a significant power consumption reducing effect can be achieved with respect to a bright screen with the white peak.

As described above, according to this embodiment, data outside the white peak data area is not subjected to six-color conversion but is displayed in RGB, thereby making it possible to reduce the cost of the conversion circuit.

Accordingly, although the power consumption reducing effect slightly decreases, a significant power consumption reducing effect can be achieved as in Embodiment 6 with respect to a bright screen including white peak display data, whereby a liquid crystal display device capable of achieving both a substantial improvement in white luminance and low power consumption can be provided at low cost.

Embodiment 8

This embodiment is the same as Embodiment 7 except for the requirement as described below.

As shown in FIG. 14(3), according to a six-color subpixel arrangement within the liquid crystal display section according to this embodiment, the light red subpixel 1346, the light green subpixel 1347, and the light blue subpixel 1348 are smaller in surface area than the red subpixel 1341, the green subpixel 1342, and the blue subpixel 1343.

As in Embodiment 3, this is to minimize a reduction in brightness when displaying the primary colors such as red, green, and blue. It should be noted that, as in Embodiment 3, the surface area of each light-colored subpixel is set so that the white peak luminance when the maximum white peak signal is input is about 20% higher than that of 100% white displayed in RGB.

Further, the backlight according to this embodiment is a backlight using LEDs (light emitting diodes) that can be controlled for each of the three primary colors of red, green, and blue.

While the light emission quantity of this backlight is controlled by the BL luminance control circuit inside the image data conversion circuit as in Embodiment 7, in this embodiment, the backlight controlling method for the screen including pixels in the white peak display data area and that for the screen including only data of 100% white or less differ from each other. For the screen including only data of 100% white or less, the control is performed individually for each of the three primary colors of red, green, and blue, and for the screen including pixels in the white peak display data area, the three colors of red, green, and blue are identically handled for control as white color.

Figure 16:
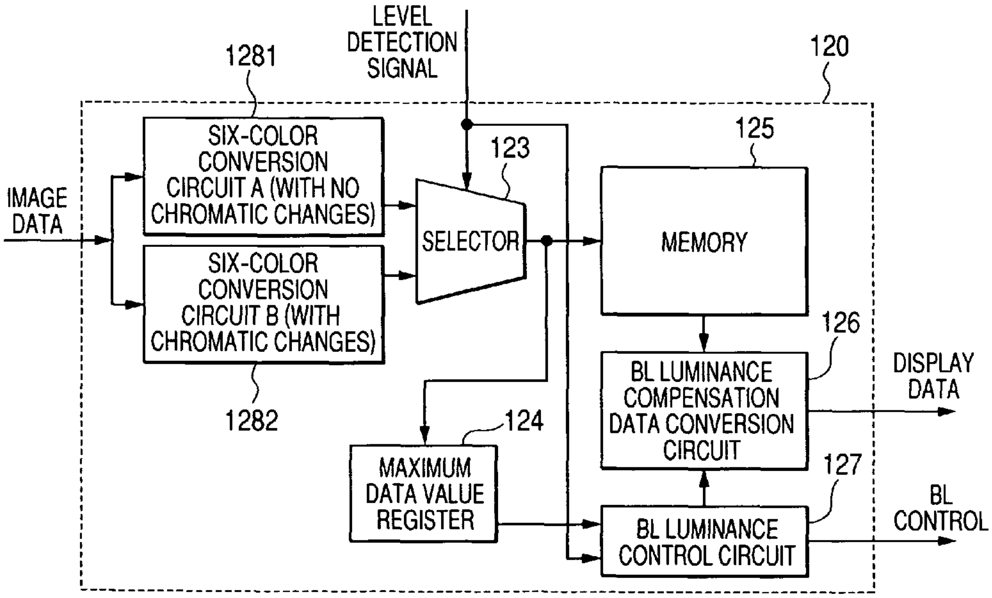
FIG. 16 is an internal block diagram of an image data conversion circuit according to Embodiment 8.

Therefore, as shown in FIG. 16, in the image data conversion circuit 120 according to this embodiment, the level detection signal from the level detection circuit 110 is also input to the BL luminance control circuit 127, whereby the presence/absence of the white peak is determined on a screen-by-screen basis.

It should be noted that in this embodiment, for the same reason as described in Embodiment 3, for the screen including display data in the white peak display data area, data is converted into six colors and the backlight is controlled with RGB being collectively handled as white color, and for other screens, data is used in three RGB colors as it is without six-color conversion, and the backlight is controlled with the three primary colors being controlled independently.

Accordingly, as compared with Embodiment 7, a reduction in power consumption can be achieved even for a screen with no white peak display data area.

As described above, according to this embodiment, when displaying data, the control mode of the backlight is switched in accordance with the presence/absence of white peak display within the display screen, thereby enabling a further reduction in power consumption.

Embodiment 9

This embodiment is the same as Embodiment 8 except for the requirement as described below.

Figure 17:
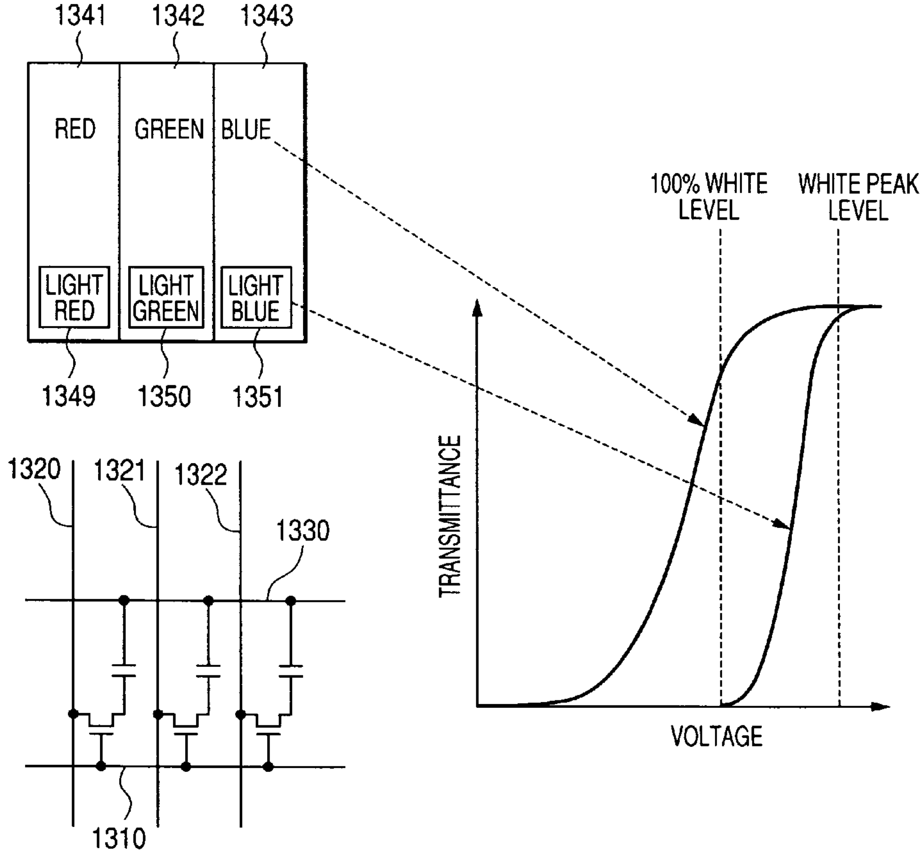
FIG. 17 is a diagram showing a six-color pixel structure and voltage-transmittance characteristics according to each of Embodiments 9 and 10.

A pixel structure according to this embodiment is shown in FIG. 17. In this embodiment, the pixel structure is different from that of Embodiment 8 in that a light red auxiliary pixel area 1349, a light green auxiliary pixel area 1350, and a light blue auxiliary pixel area 1351, which are light-colored auxiliary pixel areas for the respective colors, are included in the red, green, and blue subpixels, respectively.

It should be noted that, as in Embodiment 4, each light-colored auxiliary pixel area is not individually driven by a transistor or signal line but shares the voltage value with other areas within each of the red, green, and blue subpixels.

However, the light-colored auxiliary pixel area differs from the other areas in voltage-transmittance characteristics; the voltage threshold at which the transmittance begins to increase is high, with a steep increase of the transmittance thereafter.

Due to these characteristics, in the case of application of a voltage not higher than the threshold for each light-colored auxiliary pixel area, display can be performed using the RGB pixels without chromatic changes, and in the case of application of a voltage not lower than the threshold for each light-colored auxiliary pixel area, display with chromatic changes and with a luminance improving effect using each light-colored auxiliary pixel is possible.

Accordingly, the six-color conversion circuit B1282 inside the image data conversion circuit 120 can be made extremely small in scale, thereby allowing a reduction in cost.

It should be noted that as in Embodiment 4, the above-described voltage-transmittance characteristics of each light-colored auxiliary pixel area can be realized through optimization of the parameters of the pixel electrode structure. Further, as in Embodiment 8, the surface area of each light-colored auxiliary pixel area is set so that upon input of the maximum white peak signal, the white peak luminance becomes 20% higher than that of the normal 100% white.

As described above, according to this embodiment, within each of the red, green, and blue subpixels, the light-colored auxiliary pixel area with voltage-transmittance characteristics different from those of the respective subpixels is provided. The circuit for six-color data conversion can thus be made extremely small in scale, whereby a liquid crystal display capable of achieving both a substantial improvement in white luminance and low power consumption can be provided at lower cost.

While in this embodiment as well each light-colored auxiliary pixel area is arranged at an end of the screen, the light-colored auxiliary pixel area may be arranged at the central portion of the screen to achieve the multi-domain structure.

Embodiment 10

This embodiment is the same as Embodiment 9 except for the requirement as described below.

As in Embodiment 5, the block diagram of a liquid crystal display according to this embodiment is as shown in FIG. 13. The input image data is also input to the image data analyzing circuit 100. The image data analyzing circuit 100 extracts pixels that are recognized as the white peak from the input one screen image, and sends the minimum level value of the white peak data of those recognized pixels to the level detection circuit 110 as the 100% white display level.

Unlike in Embodiments 6 to 9, the level detection circuit 110 does not perform level detection on the basis of a predetermined 100% white level but performs level detection on the basis of the 100% white display level on a screen-by-screen basis sent from the image data analyzing circuit 100 and outputs whether or not the data is white peak display data.

This is because, as in Embodiment 5, the 100% white level often varies according to the kind of the input image data.

As described above, according to this embodiment, the 100% white level is recognized through image analysis on a screen-by-screen basis, whereby it is possible to provide a liquid crystal display device capable of displaying an image of higher image quality.

Embodiment 11

Figure 18:
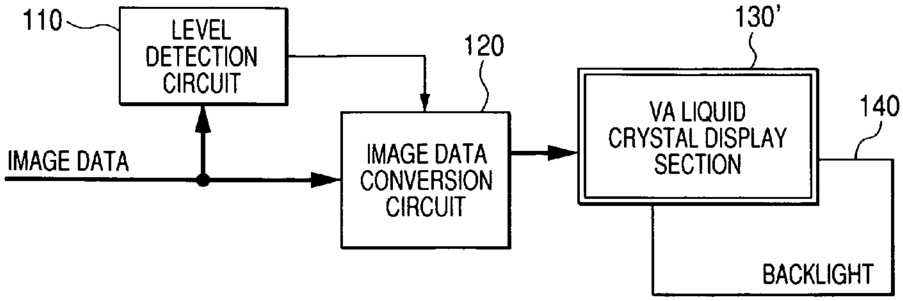
FIG. 18 is a block diagram of a liquid crystal display device according to Embodiment 11.

FIG. 18 is a block diagram of a liquid crystal display device according to this embodiment. The liquid crystal display device according to this embodiment is composed of the level detection circuit 110, the mage data conversion circuit 120, a VA liquid crystal display section 130', and the backlight 140.

The input image data to be displayed is input to the level detection circuit 110 for level detection for each pixel data, and the result of the level detection is output to the image data conversion circuit 120.

Further, on the basis of the input image data and a signal from the level detection circuit 110, the image data conversion circuit 120 converts the image data and outputs it to the VA liquid crystal display section 130'.

Here, while the VA liquid crystal display section 130' is composed of a group of pixels having red, green, and blue subpixels like a normal liquid crystal display, as the liquid crystal mode for controlling transmission/shut-off of the light of the backlight 140, a VA (Vertical Alignment) type, instead of an IPS type, liquid crystal is used. The voltage-transmittance characteristics of the VA type liquid crystal is shown in FIG. 19(1).

Figure 19:
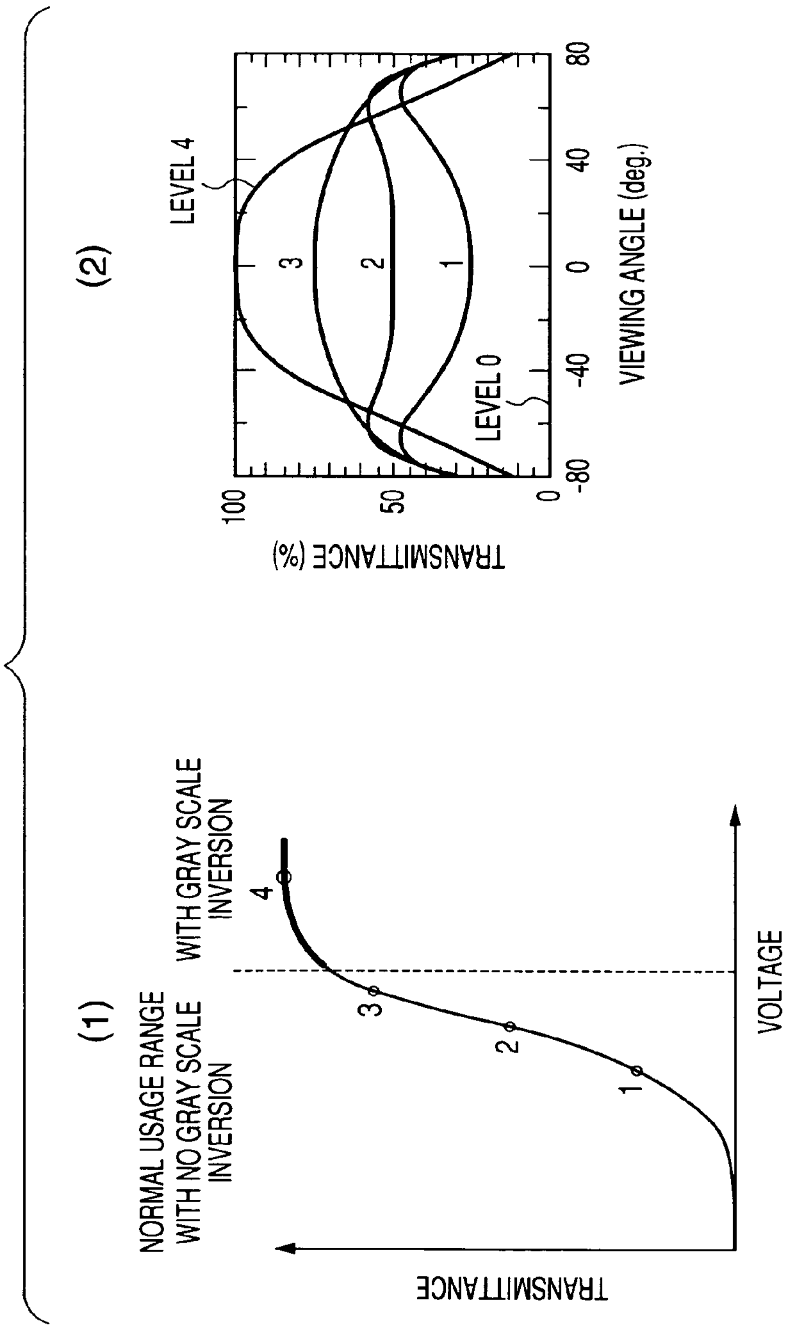
FIG. 19 is a diagram showing the characteristics of a VA type liquid crystal mode according to Embodiment 11.

In the VA type liquid crystal display mode, like the IPS type, the transmittance increases as the voltage increases; however, as indicated by the dotted line in FIG. 19(1), at a transmittance corresponding to a certain voltage or more, gray scale inversion occurs when viewed laterally from the side.

Here, with respect to the several transmittance levels indicated by numerals in FIG. 19(1), a diagram showing viewing angle on the horizontal axis and transmittance on the vertical axis (angle dependency of transmittance) is shown in FIG. 19(2). This diagram is one described in IDRC' 03 P.65 Uchida. et al mentioned above.

In FIG. 19(2), in the viewing angle region of about 60 degrees or more, the transmittance of Level 4, which should be the brightest, becomes lower than the transmittances of other levels, which indicates the occurrence of gray scale inversion. That is, when the transmittance of Level 4 is used within the image at all times, the resulting viewing angle characteristics may not necessarily be good.

In view of this, when using this VA type liquid crystal mode, normally, a voltage region in which gray scale inversion occurs is not used, and the transmittance is controlled using regions with voltages not higher than that of this voltage region.

Here, in this embodiment, attention is directed to the white peak characteristics as defined by the NTSC standard and the Hi-Vision standard that are television broadcast standards. That is, since there are not a very large number of pixels having white peak display data within the screen, even if only those pixels undergo gray scale inversion, image degradation due to the gray scale inversion should not become very conspicuous.

On the other hand, since the white peak luminance as viewed from the front becomes high, an image quality improving effect can be anticipated.

In view of this, according to this embodiment, only the pixel data of a level higher than the 100% white level as defined by the NTSC standard or the Hi-Vision standard is converted into a voltage region with gray scale inversion, and pixels of a level not higher than the 100% white level are converted into a level using a voltage region with no gray scale inversion.

Accordingly, with respect to the pixels of the white peak level, although gray scale inversion occurs, the probability of the gray scale inversion occurring within the screen is low and a luminance improving effect is attained, whereby a substantial improvement in transmittance can be regarded as being achieved.

Figure 20:
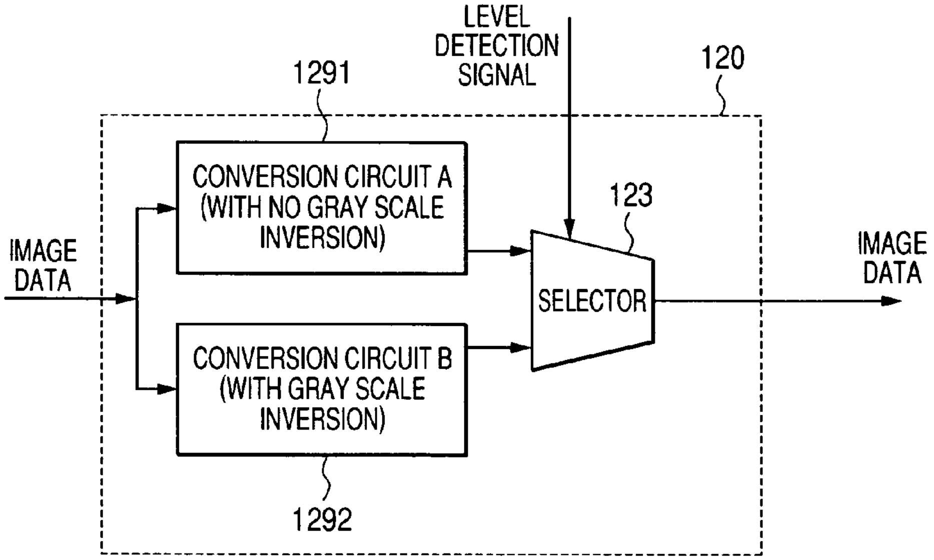
FIG. 20 is internal block diagram of an image data conversion circuit according to Embodiment 11.

Next, data conversion according to this embodiment will be described with reference to FIG. 20. Image data input to the image data conversion circuit 120 is input to a data conversion circuit A1291 that performs data conversion without gray scale inversion and to a data conversion circuit A1292 that performs data conversion involving gray scale inversion.

Then, the outputs from both the circuits undergo selection by the selector 123 on the basis of a level detection signal from the level detection circuit 110; if equal to or lower than the 100% white level, the output of the data conversion circuit A1291 is output to the liquid crystal display section 130', and if equal to or lower than the 100% white level, the output of the data conversion circuit A1292 is output to the liquid crystal display section 130'.

Here, when the 100% white level of the input image data as defined by a specific standard, and the maximum transmittance level with no gray scale inversion in the VA type liquid crystal mode differ from each other (such as when the defined 100% white level is, for example, 1/1.21=82.6%, and the maximum transmittance with no gray scale inversion is 90% of the maximum transmittance with gray scale inversion), it is necessary to perform different data conversion in the respective regions.

For this reason, it is necessary to prepare two data conversion circuit systems. It should be noted that since the defined 100% white level differs among different broadcast standards as described above, the 100% white level and the maximum transmittance level with no gray scale conversion cannot be made the same with respect to all the standards.

As described above, according to this embodiment, only the white peak display data area is subjected to data conversion using the display level with gray scale inversion, whereby a substantial improvement is achieved in terms of transmittance to achieve a substantial improvement in white luminance without an increase in power consumption.

It is thus possible to provide a liquid crystal display device capable of achieving both a substantial improvement in white luminance and low power consumption.

Embodiment 12

This embodiment is the same as Embodiment 11 except for the requirement as described below.

Figure 21:
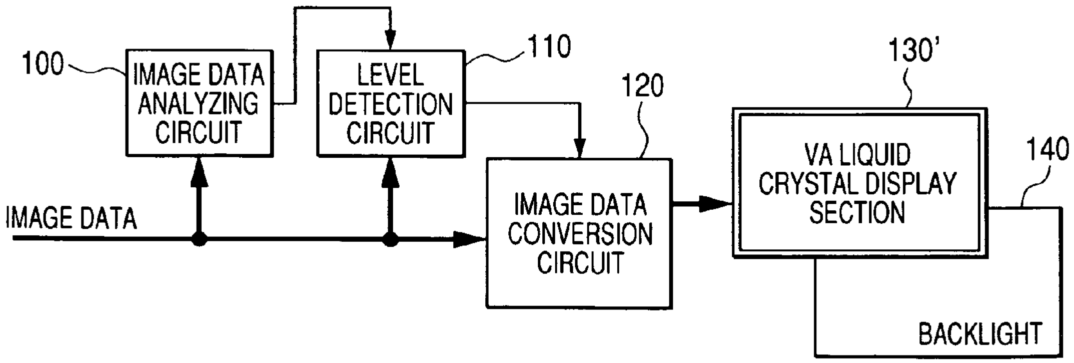
FIG. 21 is a block diagram of a liquid crystal display device according to Embodiment 12.

FIG. 21 is a block diagram of a liquid crystal display device according to this embodiment. In the liquid crystal display device according to this embodiment, the input image data is also input to the image data analyzing circuit 100. The image data analyzing circuit 100 extracts pixels that are recognized as the white peak from the input one screen image, and sends the minimum level value of the white peak data of those recognized pixels to the level detection circuit 110 as the 100% white display level.

Unlike in Embodiment 11, the level detection circuit 110 does not perform level detection on the basis of a predetermined 100% white level but performs level detection on the basis of the 100% white display level on a screen-by-screen basis sent from the image data analyzing circuit 100 and outputs whether or not the data is white peak display data.

This is because the 100% white level often varies according to the kind of the input image data, and moreover because there are image signals that do not comply with the assumed 100% white level.

For example, the value of the 100% white level is different between the NTSC standard that is an analog broadcast standard in Japan, and the ITU-R recommendation 705 that is a Hi-Vision broadcast standard. Further, some of image signals output from a DVD player or the like use the white peak region as if it were a normal region (this is particularly the case with video contents of a cinema film material).

In the latter case, in particular, since there is a fear of gray scale inversion occurring across the entire screen, defective image elements increase. In view of this, in this embodiment, there is provided means (image data analyzing circuit 100) for determining the 100% white level on a screen-by-screen basis by performing image data analysis for each screen.

Accordingly, the white level can be recognized with greater accuracy, thereby making it possible to obtain an image of higher image quality.

As described above, according to this embodiment, the 100% white level is recognized through image analysis on a screen-by-screen basis, thereby making it possible to provide a liquid crystal display device capable of displaying an image of higher image quality.

What is claimed is:

1. A liquid crystal display device comprising:

a level detection circuit for detecting whether or not a level of input image data is higher than a predetermined level;

an image data conversion circuit for converting input image data in accordance with a detection signal from the level detection circuit; and a liquid crystal display section that receives image data from the image data conversion circuit, for displaying an image by pixels of four colors of red, green, blue, and white;

wherein in the image data conversion circuit, conversion of input image data of a level equal to or lower than the predetermined level is conversion in which chromaticity and luminance are maintained as compared with chromaticity and luminance prior to the conversion, and conversion of input image data of a level higher than the predetermined level includes conversion in which at least chromaticity is changed as compared with chromaticity prior to the conversion.

2. The liquid crystal display device according to claim 1, wherein the predetermined level is a 100% white level as represented by 100 IRE in the NTSC standard or 940 (nominal peak) in the HDTV 10-bit digital standard.

3. The liquid crystal display device according to claim 1, wherein the predetermined level is a 100% white level as determined by an image data analyzing circuit that analyzes input image data.

4. The liquid crystal display device according to claim 1, wherein in the image data conversion circuit, conversion of input image data of a level equal to or lower than the predetermined level is conversion using three colors of red, green, and blue, and conversion of input image data of a level higher than the predetermined level is conversion using four colors of red, green, blue, and white.

5. The liquid crystal display device according to claim 1, wherein in the image data conversion circuit, conversion of input image data is conversion using four colors of red, green, blue, and white.

6. The liquid crystal display device according to claim 1, wherein each of the pixels of the liquid crystal display section includes four subpixels of red, green, blue, and white, and wherein the subpixels are equal in surface area.

7. The liquid crystal display device according to claim 1, wherein each of the pixels of the liquid crystal display section includes four subpixels of red, green, blue, and white, and wherein the white subpixel is smaller in surface area than the other three subpixels.

8. The liquid crystal display device according to claim 1, wherein each of the pixels of the liquid crystal display section includes three subpixels of red, green, and blue, each of the subpixels includes a white display auxiliary pixel area, and voltage-transmittance characteristics of the white display auxiliary pixel area are different from those of the other portions.

9. The liquid crystal display device according to claim 8, wherein the voltage-transmittance characteristics of the white display auxiliary pixel area are such that a voltage threshold is high in comparison to the other portions, and that in a region higher than the high voltage threshold, transmittance increases steeply.

10. The liquid crystal display device accordingly to claim 1, wherein the image data conversion circuit includes a selector, and wherein the selector selects either the conversion of input image data of the level equal to or lower than the predetermined level or the conversion of input image data of a level higher than the predetermined level according to a level detection signal from the level detection circuit.

11. A liquid crystal display device comprising:

a level detection circuit for detecting whether or not a level of input image data is higher than a predetermined level;

an image data conversion circuit for converting input image data in accordance with a detection signal from the level detection circuit;

a liquid crystal display section that receives image data from the image data conversion circuit, for displaying an image by pixels of six colors of red, green, blue, light red, light green, and light blue;

wherein in the image data conversion circuit, conversion of input image data of a level equal to or lower than the predetermined level is conversion in which chromaticity and luminance are maintained as compared with chromaticity and luminance prior to the conversion, and conversion of input image data of a level higher than the predetermined level includes conversion in which at least chromaticity is changed as compared with chromaticity prior to the conversion.

12. The liquid crystal display device according to claim 11, wherein the predetermined level is a 100% white level as represented by 100 IRE in the NTSC standard or 940 (nominal peak) in the HDTV 10-bit digital standard.

13. The liquid crystal display device according to claim 11, wherein the predetermined level is a 100% white level as determined by an image data analyzing circuit that analyzes input image data.

14. The liquid crystal display device according to claim 11, wherein in the image data conversion circuit, conversion of input image data of a level equal to or lower than the predetermined level is conversion using three colors of red, green, and blue, and conversion of input image data of a level higher than the predetermined level is conversion using six colors of red, green, blue, light red, light green, and light blue.

15. The liquid crystal display device according to claim 11, wherein in the image data conversion circuit, conversion of input image data is conversion using six colors of red, green, blue, light red, light green, and light blue.

16. The liquid crystal display device according to claim 11, wherein each of the pixels of the liquid crystal display section includes six subpixels of red, green, blue, light red, light green, and light blue, and wherein the subpixels are equal in surface area.

17. The liquid crystal display device according to claim 11, wherein each of the pixels of the liquid crystal display section includes six subpixels of red, green, blue, light red, light green, and light blue, and wherein the light red, light green, and light blue subpixels are smaller in surface area than the other three subpixels.

18. The liquid crystal display device according to claim 11, wherein each of the pixels of the liquid crystal display section includes three subpixels of red, green, and blue, the red, green, and blue subpixels respectively include light-colored display auxiliary pixel areas of light red, light green, and light blue, which are light-colored areas with respect to the respective colors of red, green, and blue, and voltage-transmittance characteristics of the light-colored display auxiliary pixel areas are different from those of the other portions.

19. The liquid crystal display device according to claim 18, wherein the voltage-transmittance characteristics of the light-colored display auxiliary pixel areas are such that a voltage threshold is high in comparison to the other portions, and that in a region higher than the high voltage threshold, transmittance increases steeply.

20. The liquid crystal display device according to claim 1 or 11, wherein in addition to converting input image data, the image data conversion circuit also controls a light quantity of a backlight.

21. The liquid crystal display device according to claim 20, wherein in the backlight a light emission quantity as white color is controlled.

22. The liquid crystal display device according to claim 20, wherein in the backlight light-emission quantities of three colors of red, green, and blue are individually controlled.

23. The liquid crystal display device according to claim 22, wherein in the control of the light quantity of the backlight in the image data conversion circuit, for conversion of input image data of a level equal to or lower than a predetermined level, the three colors of red, green, and blue of the backlight are controlled individually, and for conversion of input image data of a level higher than the predetermined level, the three colors of red, green, and blue are controlled simultaneously.

24. The liquid crystal display device according to claim 20, wherein the image data conversion circuit converts input image data so as to make levels of image data of respective colors uniform.

25. The liquid crystal display device according to claim 11, wherein the image data conversion circuit includes a selector, and wherein the selector selects either the conversion of input image data of a level equal to or lower than the predetermined level or the conversion of input image data of a level higher than the predetermined level according to a level detection signal from the level detection circuit.

26. A liquid crystal display device comprising:

a level detection circuit for detecting whether or not a level of input image data is higher than a predetermined level;

an image data conversion circuit for converting input image data in accordance with a detection signal from the level detection circuit; and a liquid crystal display section that receives image data from the image data conversion circuit, for displaying an image by pixels of three colors of red, green, and blue;

wherein in the image data conversion circuit, conversion of input image data of a level equal to or lower than the predetermined level is conversion into a data range that does not cause gray scale inversion of the input image data when observed diagonally as compared with the input image data prior to the conversion, and conversion of input image data of a level higher than the predetermined level includes conversion using a data range that at least enables gray scale inversion of the input image data when observed diagonally as compared with the input image data prior to the conversion.

27. The liquid crystal display device according to claim 26, wherein the predetermined level is a 100% white level as represented by 100 IRE in the NTSC standard or 940 (nominal peak) in the HDTV 10-bit digital standard.

28. The liquid crystal display device according to claim 26, wherein the predetermined level is a 100% white level as determined by an image data analyzing circuit that analyzes input image data.

* * * * *